US009169861B2

(12) United States Patent
Sasuga

(10) Patent No.: US 9,169,861 B2
(45) Date of Patent: Oct. 27, 2015

(54) CASSETTE ATTACHMENT DEVICE AND CASSETTE

(75) Inventor: Shogo Sasuga, Yamanashi (JP)

(73) Assignees: TOPPAN PRINTING CO., LTD., Tokyo (JP); NISCA CORPORATION, Minamikoma-Gun, Yamanashi-Ken (JP)

( * ) Notice: Subject to any disclaimer, the term of this patent is extended or adjusted under 35 U.S.C. 154(b) by 277 days.

(21) Appl. No.: 13/811,082

(22) PCT Filed: Jul. 21, 2011

(86) PCT No.: PCT/JP2011/066616
§ 371 (c)(1),
(2), (4) Date: Mar. 14, 2013

(87) PCT Pub. No.: WO2012/011541
PCT Pub. Date: Jan. 26, 2012

(65) Prior Publication Data

US 2013/0170899 A1 Jul. 4, 2013

(30) Foreign Application Priority Data

Jul. 22, 2010 (JP) ................................ 2010-165320
Mar. 16, 2011 (JP) ................................ 2011-057588

(51) Int. Cl.
*E05C 3/02* (2006.01)
*F16B 17/00* (2006.01)
(Continued)

(52) U.S. Cl.
CPC ................ *F16B 17/00* (2013.01); *B41J 17/24* (2013.01); *B41J 17/32* (2013.01); *Y10T 403/60* (2015.01); *Y10T 403/602* (2015.01); *Y10T 403/7075* (2015.01)

(58) Field of Classification Search
CPC ........................ B41J 15/044; G11B 15/67555
USPC .................................................. 292/194, 240
See application file for complete search history.

(56) References Cited

U.S. PATENT DOCUMENTS 5,006,941 A * 4/1991 Otsuki ........................ 360/96.2
5,335,124 A * 8/1994 Yokota ....................... 360/99.06
5,434,727 A * 7/1995 Kage et al. ................ 360/96.51
(Continued)

FOREIGN PATENT DOCUMENTS

JP H07-020699 A 1/1995
JP 2001-027847 A 1/2001
(Continued)

OTHER PUBLICATIONS

PCT, "International Search Report for PCT/JP2011/066616", Sep. 6, 2011.

*Primary Examiner* — Mark Williams
(74) *Attorney, Agent, or Firm* — Manabu Kanesaka

(57) ABSTRACT

A lock member shifts between a lock position for locking a cassette inserted in a device body and a lock release position for releasing the lock to enable the cassette to be removed from the device body. Further, a push-out member shifts between a push-out position for coming into contact with a catch member provided in the device body and pushing out the cassette in a removing direction and a retracted position. Then, in conjunction with rotation action from a first position to a second position of a lock release member attached to the surface of the cassette to be rotatable, the lock member shifts from the lock position to the release position, and the push-out member shifts from the retracted position to the push-out position.

14 Claims, 18 Drawing Sheets

(51) Int. Cl.
*B41J 17/24* (2006.01)
*B41J 17/32* (2006.01)

(56) References Cited

U.S. PATENT DOCUMENTS 5,552,948 A * 9/1996 Yokota et al. .............. 360/246.3
5,646,926 A * 7/1997 Handa et al. .................. 720/636

FOREIGN PATENT DOCUMENTS

JP 2003-089257 A 3/2003
JP 2007-041104 A 2/2007

* cited by examiner

CASSETTE ATTACHMENT DEVICE AND CASSETTE

TECHNICAL FIELD

The present invention relates to a cassette attachment mechanism (hereinafter, referred to as a "cassette attachment device") for attaching a cassette to a device body such as a thermal transfer printer to be attachable and detachable.

BACKGROUND ART

The thermal transfer printer presses solid ink coated on an ink ribbon against a sheet by a printing head to transfer, and thereby performs printing. The ink ribbon is wound around rolls and stored in a ribbon cassette, and the ink ribbon cassette has a removable configuration to be attachable and detachable to/from the thermal transfer printer body so as to replace the ribbon cassette itself when the ink ribbon has run out.

However, in the case of using the thermal transfer printer for business use particularly, for example, combining with another device such as a card processing device to use, since a large amount of ink ribbon is used, it is necessary to increase the diameter of the roll to wind the ink ribbon, and the cassette is increased in size.

Therefore, it requires considerable work to remove a size-increased heavy cassette from the thermal transfer printer and insert again, and more excellent operability and convenience is desired in attaching and detaching the cassette.

Patent Document 1 discloses a thermal transfer printer in which an eject member to release a lock of a ribbon cassette is slidably provided in the printer body, the lock is released by sliding the eject member, a push-out member provided in the eject member presses the ribbon cassette in the pulling-out direction in conjunction with the slide, and the ribbon cassette pops out by spring force.

PRIOR ART DOCUMENT

Patent Document

Patent Document 1: Japanese Patent Application Publication No. 2003-89257

SUMMARY OF THE INVENTION

Problems to be Solved by the Invention

In the device in Patent Document 1, the eject member is provided on the main body side of the printer, and as action for removing the ribbon cassette, two kinds of operation are required such that an operator first slides the eject member to release the lock, and next, grasps the ribbon cassette that is pushed out to pull out. Further, when the operator is operating the eject member, the ribbon cassette pops out of the main body in a free state, and may drop by popping momentum according to circumstances. Therefore, the operator needs to touch the eject member and the ribbon cassette with both hands, and there is the problem in terms of operability.

In view of the aforementioned respect, it is an object of the present invention to provide a cassette attachment device for enabling operation for releasing a lock of a cassette and action for removing from the device body to be performed at the same time.

Means for Solving the Problem

To attain the above-mentioned object, a cassette attachment device of the invention is a cassette attachment device to attach a cassette to a device body to be attachable and detachable, and is characterized by having a lock member capable of shifting between a lock position for locking the cassette inserted in the device body and a lock release position for releasing the lock to enable the cassette to be removed from the device body, a push-out member capable of shifting between a push-out position for coming into contact with a catch member provided in the device body and pushing out the cassette in a removing direction when the lock member is in the lock release position, and a retracted position separated from the catch member, and a lock release member coupled to the lock member and the push-out member directly or indirectly to be able to shift from a first position to a second position, where the lock member, the push-out member and the lock release member are provided in the cassette, and by the lock release member shifting from the first position to the second position, the lock member is shifted from the lock position to the release position, while the push-out member is shifted from the retracted position to the push-out position.

Then, the lock release member is characterized by being configured to be able to shift to a third position of not acting on the lock member and the push-out member after shifting from the first position to the second position.

Further, it is configured that the push-out member shifts in a first direction by the lock release member shifting from the first position to the second position, and that the push-out member shifts in a second direction by the lock release member shifting from the third position to the first position, and it is a feature that the push-out member and the lock member concurrently shift when the push-out member shifts in the first direction, and that only the push-out member shifts when the push-out member shifts in the second direction.

Furthermore, the device is characterized by having a protrusion portion formed in the lock release member, a first rotating body having an engagement piece that engages in the protrusion portion with rotation of the lock release member and the push-out member, a second rotating body having the lock member, and a latch member provided in the device body to engage in the lock member present in the lock position, where when the protrusion portion and the engagement piece engage in each other and the first rotating body rotates in the first direction by the lock release member rotating from the first position to the second position, the second rotating body rotates in conjunction with the first rotating body, the lock member thereby shifts to the lock release position to release engagement with the latch member, and by rotation of the first rotating body, the push-out member shifts to the push-out position to come into contact with the catch member.

Still furthermore, it is a feature that the first rotating body and the second rotating body are stacked on the same axis and disposed, on mutually connected surfaces are formed tapers with respective inclined directions being opposite so that when one of the first rotating body and the second rotating body rotates and a rise portion of the taper of the first rotating body is engaged in a rise portion of the taper of the second rotating body, the other body rotates in conjunction with the one, a first biasing member that biases the lock member in a direction of the lock position is further provided, the second rotating body rotates by the rise portion of the taper of the first rotating body pressing the rise portion of the taper of the second rotating body, by rotation of the first rotating body in the first direction by the protrusion portion pressing the engagement piece when the lock release member rotates from the first position to the second position, the lock member shifts to the lock position against biasing of the first biasing member, the first rotating body rotates by the rise portion of the taper of the second rotating body pressing the rise portion of the taper of the first rotating body, by rotation of the second rotating body in the second direction by biasing of the first biasing member when the lock release member arrives at the second position and the protrusion portion does not press the engagement piece, the position relationship between the protrusion portion and the engagement piece is thereby swapped, and that when the lock release member is next rotated to the first position, the protrusion portion presses the engagement piece so that the first rotating body rotates in the second direction.

Moreover, it is a feature that a second biasing member is provided to bias the first rotating body to rotate in the first direction, the rise portion of the taper of the first rotating body is not engaged in the rise portion of the taper of the second rotating body when the lock release member rotates to the first position, the first rotating body rotates alone in the second direction by engagement between the protrusion portion and the engagement piece, and when the engagement between the protrusion portion and the engagement piece is released by rotation of the lock release member, returns and rotates in the first direction by being biased by the second biasing member, the position relationship between the protrusion portion and the engagement piece is thereby swapped, and that when the lock release member is next rotated from the first position to the second position, the protrusion portion presses the engagement piece so that the first rotating body rotates in the first direction.

Further, it is a feature that the lock member is provided with an inclined portion that comes into contact with the latch member in inserting the cassette in the device body, the lock member shifts to the lock release position by contact of the inclined portion with the latch member, and then, shifts to the lock position to engage in the latch member by biasing of the first biasing member when the contact between the lock member and the latch member is released, at this point the second rotating body rotates in the first direction by the lock member shifting to the lock release position, the first rotating body rotates together with the second rotating body by biasing of the second biasing member, engagement is thereby maintained between the rise portion of the taper of the first rotating body and the rise portion of the taper of the second rotating body, and that when the contact between the lock member and the latch member is released and the second rotating body rotates in the second direction by the lock member shifting to the lock position, the first rotating body rotates in conjunction therewith by the rise portion of the taper of the second rotating body pressing the rise portion of the taper of the first rotating body.

Then, it is a feature that the lock release member is comprised of a grip member of the cassette, and that the grip member is provided rotatably in a housing of the cassette.

It is a feature that in a coupling portion that couples the grip member and the housing rotatably, on surfaces on which the grip member and the housing contact each other are formed respective tapers with inclined directions being mutually opposite, and that when the grip member is in the third position, the tapers are engaged in each other in the grip member and the housing.

Then, the grip member is characterized by being biased by a spring toward the first position.

Further, to attain the above-mentioned object, a cassette of the invention is a cassette to attach to a device body to be attachable and detachable, and is characterized by having a lock member capable of shifting between a lock position for locking the cassette inserted in the device body and a lock release position for releasing the lock to enable the cassette to be removed from the device body, a push-out member capable of shifting between a push-out position for pushing out the cassette in a direction for removing from the device body when the lock member is in the lock release position, and an insertion position for enabling the cassette to be inserted, and a lock release member coupled to the lock member and the push-out member directly or indirectly to be able to shift from a first position to a second position, where by the lock release member shifting from the first position to the second position, the lock member is shifted from the lock position to the release position, and the push-out member is shifted from the insertion position to the push-out position.

Advantageous Effect of the Invention

According to the invention, since release of the lock and biasing in the cassette removing direction is both achieved only by rotating the lock release member attached to the cassette from the first position to the second position, not only the operation for removing is made easy, but also it is possible to prevent the cassette from popping out vigorously and dropping due to biasing in the cassette removing direction, by the operator grasping the lock release member. Then, by making lock release and pulling-out the same operation, it is possible to perform reliable operation only by one hand, and operability is improved.

EMBODIMENT OF THE INVENTION

Figure 1:
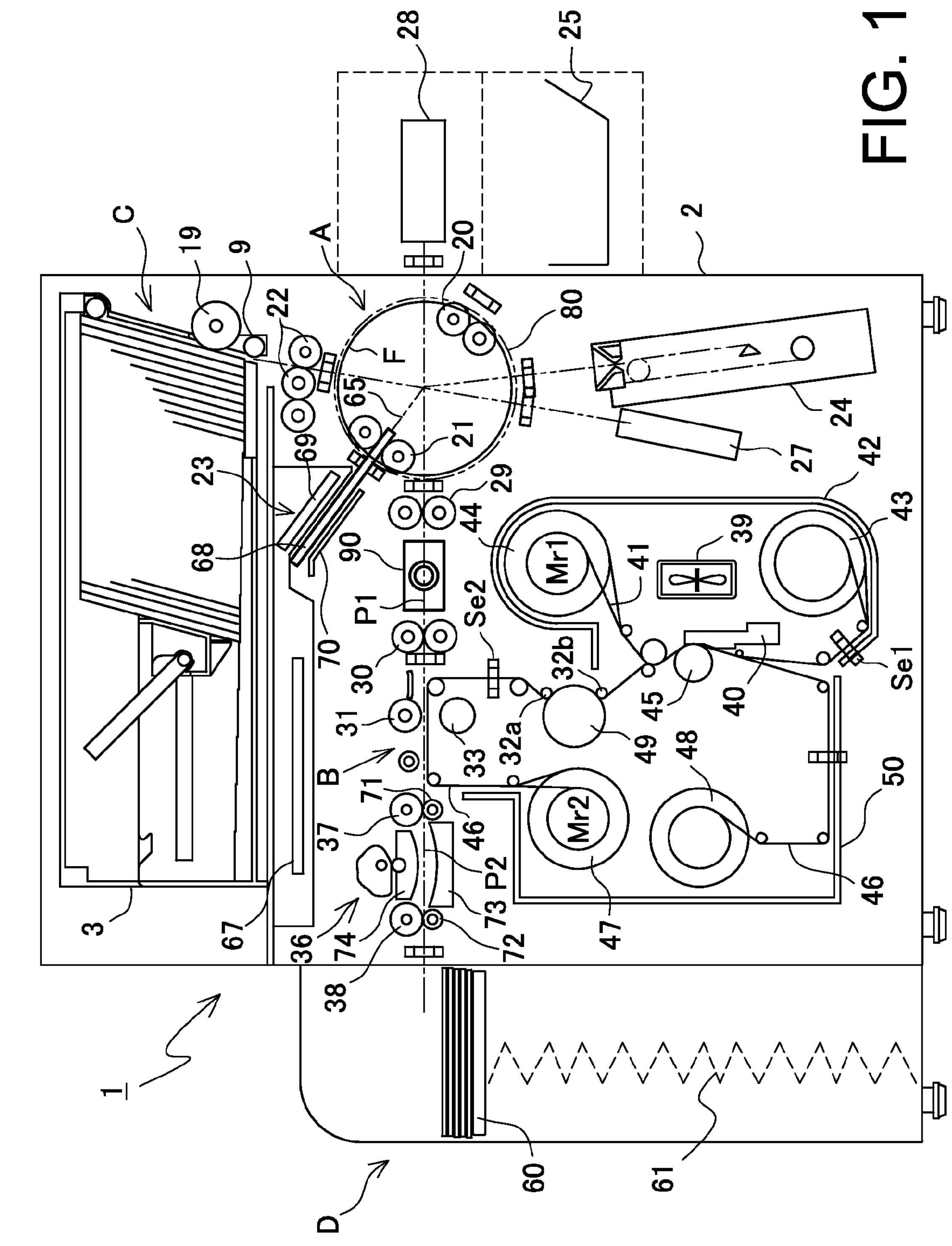
FIG. 1 is an explanatory view illustrating an entire configuration.

The present invention will be described below using a card processing device as an example as a suitable Embodiment. Cards that a card processing device 1 of which the entire configuration is shown in FIG. 1 are ID cards for various kinds of identification, credit cards for transactions and the like, and the device electronically records information on the card, while recording image information on the surface of the card with a thermal transfer printer. Accordingly, a housing 2 is provided with an image recording section A, thermal transfer printer B, and card storage section C.

The information recording section A is comprised of a magnetic recording section 24, non-contact type IC recording section 23, and contact type IC recording section 27. The information recording section A is comprised of various recording sections, for example, barcode recording section corresponding to device specifications.

The card storage section C is comprised of a card cassette 3 that stores a plurality of cards. The card cassette 3 is capable of being removed from a cassette insertion area of the device housing 2.

[Card Supply Section]

The card storage section C is provided in the cassette insertion area of the device housing 2, and is comprised of the card cassette 3 that stores a plurality of cards. The card cassette 3 as shown in FIG. 1 aligns and stores a plurality of cards in a standing posture, and cards are fed from the left end to the right end as viewed in the figure. Then, a separation opening 7 is provided at the front end of the card cassette 3, and cards are supplied into the device by a pickup roller 19 starting with the card in the front row.

[Configuration of the Information Recording Section]

The card fed from the card cassette 3 is fed to a reverse unit F by carry-in rollers 22. The reverse unit F is comprised of a rotating frame 80 bearing-supported by a device frame 60 to be turnable, and a pair or a plurality of pairs of rollers supported on the frame.

In the device as shown in the figure, two roller pairs 20, 21 disposed at a distance at the front and back are axially supported by the rotating frame 80 to be rotatable. Then, the rotating frame 80 turns in a predetermined-angle direction by a turn motor (pulse motor or the like), and the roller pairs attached to the frame are configured to rotate in the forward and backward directions by a transport motor. This driving mechanism may be configured so that one pulse motor switches between turning of the rotating frame 80 and rotation of the roller pairs 20, 21 with a clutch, or different driving may be configured for turning of the rotating frame 80 and rotation of the roller pairs 20, 21.

Accordingly, cards prepared in the card cassette 3 are separated on a card-by-card basis by the pickup roller 19 and separation roller (idle roller) 9 to be fed to the reverse unit F on the downstream side. Then, the reverse unit F carries the card in the unit by the roller pairs 20, 21, and changes the posture in the predetermined-angle direction with the card nipped by the roller pairs.

Around the reverse unit F in the turn direction are disposed the magnetic recording section 24, non-contact type IC recording section 23, contact type IC recording section 27, and reject stacker 25. Then, the roller pairs 20, 21 form a card carry-in path 65 for carrying in toward one of the information recording sections 23, 24, and 27. In addition, a barcode reader 28 is a unit to read a barcode printed with the thermal transfer printer B, described later, for example, to verify (error check).

When the card that is posture-changed in the predetermined angle in the reverse unit F is carried to the magnetic recording section 24, non-contact type IC recording section 23, or contact type IC recording section 27 through the card carry-in path 65 formed by the roller pairs 20, 21, it is made possible to input data to the card magnetically or electrically. Further, when any error occurs in these information recording sections, the card is carried out to the reject stacker 25.

In FIG. 1, the reverse unit F turns toward the non-contact type IC recording section 23, and forms the card carry-in path 65 with the card toward the recording section 23 by the roller pairs 20, 21. The non-contact type IC recording section 23 is comprised of an IC reader/writer board 67, IC reader/writer antenna 69, and card transport path 68, and the IC reader/writer antenna 69 transmits information, by radio signals, output from the IC reader/writer board 67 to an IC chip embedded in the card that is guided to the card transport path 68 through the card carry-in path 65. By this means, the recording information is recorded in the IC chip.

A shield plate 70 for shielding the radio signals from the IC reader/writer antenna 67 is disposed in between the card transport path 68 and a card transport path P1, and thereby prevents the information from being recorded erroneously in another card that is transported in the card transport path P1. The shield plate 70 is formed of a shield material (radio wave absorbing body), and selected as the shield material are materials that absorb radio waves of a particular band to shield.

The thermal transfer printer B is provided on the downstream side of the reverse unit F, the card transport path P1 that carries the card to the thermal transfer printer B is provided, and the reverse unit F is disposed in the path P1. Further, transport rollers 29, 30 that transport the card are disposed in the card transport path P1, and are coupled to a transport motor, not shown. The transport rollers 29, 30 are configured to enable forward rotation and backward rotation to be switched, and transport the card from the thermal transfer printer B to the reverse unit F in a similar manner for transporting the card from the reverse unit F to the thermal transfer printer B.

Further, the transport rollers 29, 30 are roller pairs such that the transported card is nipped by a pair of up and down rollers and fed out. Then, a skew correction device 90 is disposed in between the transport rollers 29 and 30. Although not shown specifically, the skew correction device 90 is provided with a width-shift member on one side and a guide member on the other side along the transport direction of the card transport path P1, pushes out the card transported by the transport rollers 29, 30 toward the guide member by the width-shift member, and thereby transports the card with the skew corrected toward the thermal transfer printer B.

On the downstream side of the thermal transfer printer B is provided a card transport path P2 that carries the card to a storage stacker 60. Transport rollers (that may be belts) 37, 38 that transport the card are disposed in the card transport path P2, and are coupled to a transport roller, not shown.

A decurl mechanism 36 is disposed in between the transport rollers 37 and 38, presses the card center portion held between the transport rollers 37, 38, and thereby corrects curl that is caused by thermal transfer. Therefore, the decurl mechanism 36 is configured to be able to shift to positions in the vertical direction as viewed in FIG. 1 by an up-and-down mechanism (cam or the like), not shown.

The transport rollers 37, 38 nip the decurled card respectively with nip rollers 71, 72, and when a pressing portion 74 is pushed down by the up-and-down mechanism, a catch portion 73 shifts downward together with the nip rollers 71, 72 while catching the pressing portion 74. By this means, the nip of the card by the transport roller 37 and the nip roller 71, and the transport roller 38 and the nip roller 72 is released, and it is thereby to perform neat curl correction.

[Thermal Transfer Printer]

The thermal transfer printer B is to form images such as a photograph of face and character information on the frontside and backside of the recording card, and the device shows the case of forming images with a sublimation ink ribbon.

In the thermal transfer printer B are disposed a thermal head 40 and an ink ribbon 41. The ink ribbon 41 is stored in a ribbon cassette 42, a feed roll 43 and a wind roll 44 are stored in the ribbon cassette 42, and the wind roll 44 is coupled to a wind motor Mr1 not shown.

The thermal head 40 is disposed in a position opposed to a platen roller 45. The thermal head 40 is thermally controlled by a head control IC (not shown). Then, the head control IC heats and controls the thermal head 40 according to image data, and thereby forms an image on a transfer film 46, described later, with the ink ribbon 41. Therefore, it is configured that the wind roll 44 rotates in synchronization with thermal control of the thermal head 40 to wind the ink ribbon 41 at a predetermined velocity. A cooling fan 39 is to cool the thermal head 40.

The transfer film 46 is stored in a transfer film cassette 50, is wound around a wind roll 47 and a feed roll 48, and is wound and installed to carry a transfer image to a platen roller 31 and heat roller 33 that are of a thermal transfer device. A carry roller 49 is to carry the transfer film 46, on the periphery are disposed pinch rollers 32*a* and 32*b*, and the carry roller 49 is coupled to a drive motor, not shown. Then, the transfer film 46 travels in a counterclockwise direction in FIG. 1 at the same velocity as that of the ink ribbon 41.

Figure 4:
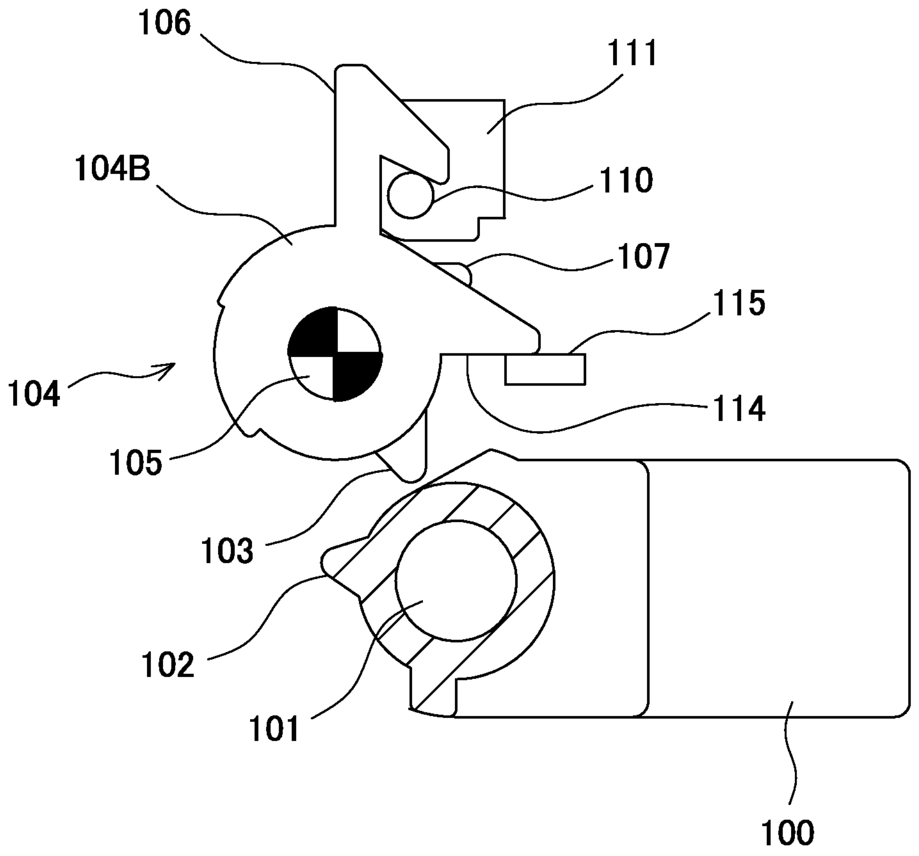
FIG. 4 is a plan view illustrating a state in which a cassette attachment device according to the invention locks the cassette and the device body.

Further, the heat roller 33 is provided with an up-and-down mechanism (not shown) to come into press-contact and separate with/from the platen roller 31 disposed in the carry-in path P1 through the transfer film 46. A dial 95 shown in FIG. 4 is in conjunction with the up-and-down mechanism, and by rotating the dial 95, it is possible to manually lift and lower the heat roller 33.

The heat roller 43 is comprised of a heating roller, and transfers an image on the transfer film 46 to the surface of the recording card with heating means disposed inside. A sensor Se1 is a sensor that detects the position of the ink ribbon 41, and a sensor Se2 is a sensor that detects the presence or absence of the transfer film 46. Further, the thermal transfer printer B is provided with the fan 39 to remove heat generated inside the device to the outside.

[Storage Section]

As shown in FIG. 1, the storage section D is configured to store cards fed from the thermal transfer printer B in the storage stacker 60. The storage stacker 60 is configured to detect the uppermost card with an up-and-down mechanism 61 and a level sensor, not shown, and shifts downward to the lower side in FIG. 1 by the up-and-down mechanism 61.

Figure 2:
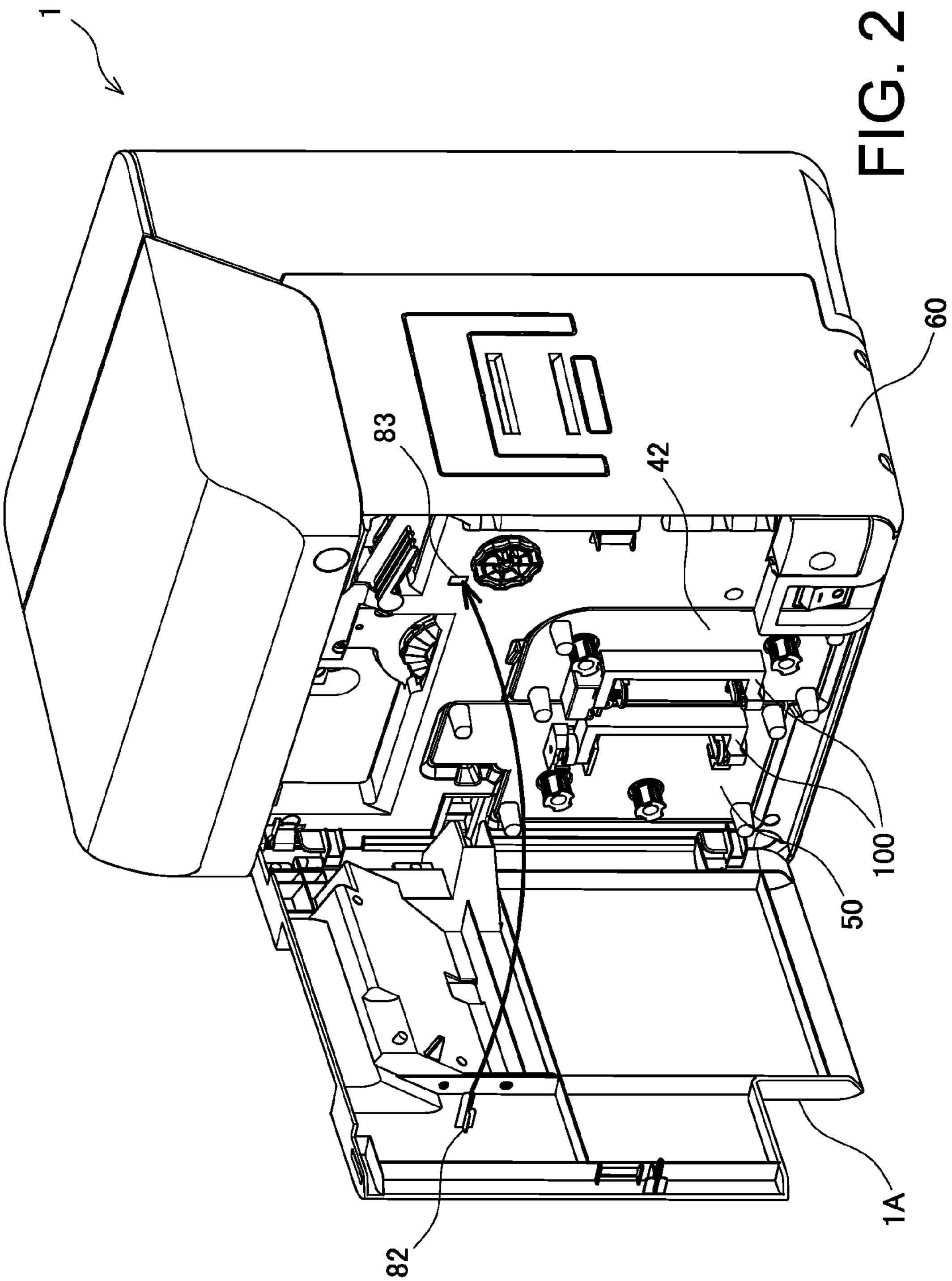
FIG. 2 is an external view of a card processing device to which the present invention is applied.

FIG. 2 shows the appearance of the card processing device, and is provided with an attachable/detachable configuration that enables the ribbon cassette 42 and the transfer film cassette 50 to be respectively inserted and removed into/from the cassette insertion area formed in the thermal transfer printer B in opening a front cover 1A that is axially supported on one side to be rotatable. Further, a pin 82 is provided on the backside of the front cover 1A, and when the front cover 1A is closed with respect to the main body and it is thereby detected that the pin 82 is inserted in an insertion hole 83 provided on the main body side, the card processing device 1 becomes an operable state.

Described is a specific configuration of a cassette attachment device of the present invention that makes it easy performing operation for releasing a lock and removing operation in removing the ribbon cassette 42 and transfer film cassette 50 (hereinafter, simply referred to as the "cassette") that are attachable and detachable to/from the thermal transfer printer B of the card processing device 1, and further performing insertion operation and operation for locking in inserting the cassette.

Figure 3:
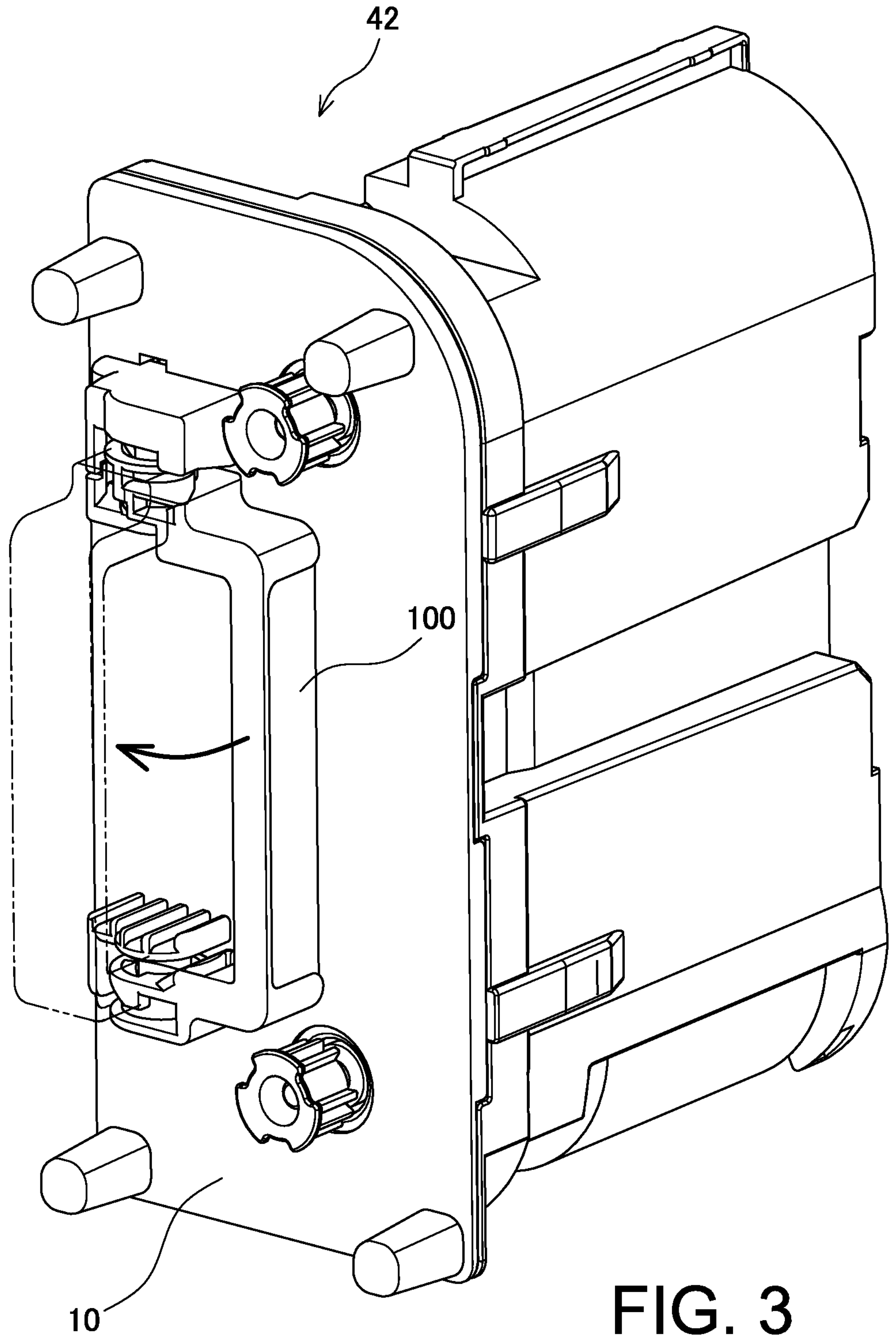
FIG. 3 is an external view of a cassette.

FIG. 3 shows the appearance of the ribbon cassette 42 that is removed from the card processing device 1. The transfer film cassette 50 is the same, and the cassette is provided with a grip member 100 to grasp on the surface that an operator faces in removing. The grip member 100 is attached to be rotatable among a first position of a state of falling on the surface of a cassette housing 10, a second position, and a third position of a state of standing from the surface of the housing 10. The grip member 100 is used also as a lock release member, and when the grip member 100 is in the second position between the first position and the third position, the cassette and the thermal transfer printer B are unlocked to enable the cassette to be removed.

FIG. 4 shows a plan view of the cassette attachment device to be attachable and detachable to/from the thermal transfer printer B, and the grip member 100 is pierced with a shaft 88 (FIGS. 13 and 14) provided inside the cassette in a shaft hole 101 provided in top and bottom sides, and is configured to rotate among the first position, second position and third position on the shaft as an axis.

A protrusion portion 102 is formed at a rotation end portion on the cassette side of the grip member 100. A rotating body 104 provided with an engagement piece 103 that engages in the protrusion portion 102 is axially supported by a shaft 105 to be rotatable.

Figure 7:
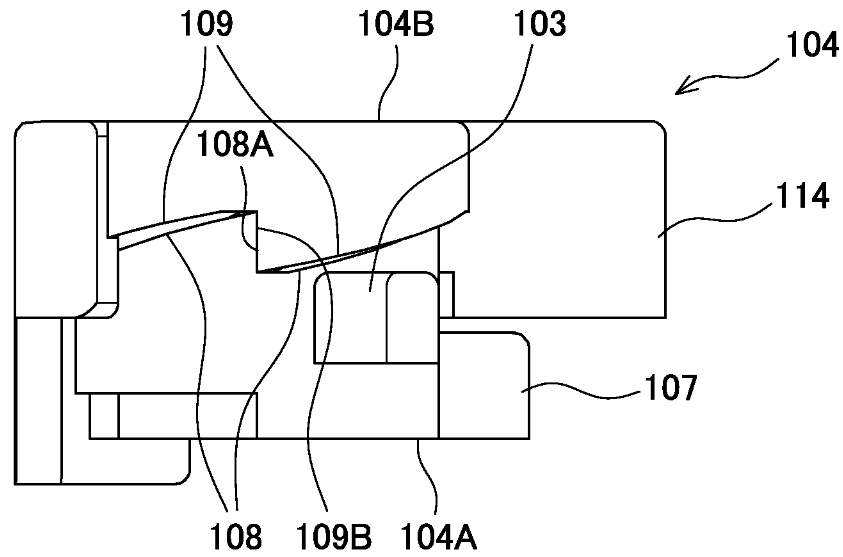
FIG. 7 is a side elevational view of a rotating body of the cassette attachment device according to the invention.
Figure 8:
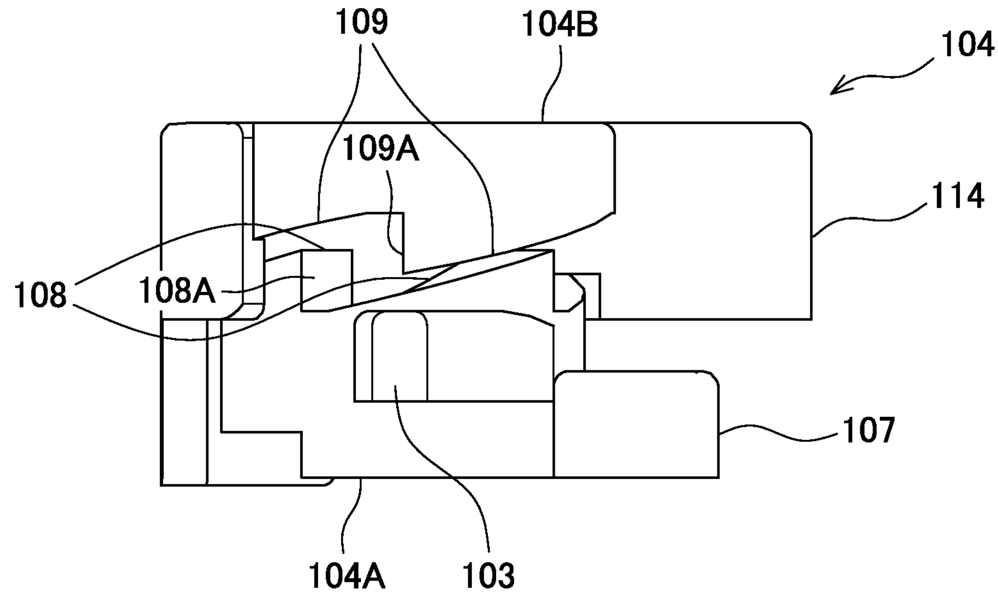
FIG. 8 is another side elevational view of the rotating body of the cassette attachment device according to the invention.

A configuration of the rotating body 104 will be described with reference to FIG. 4 and FIGS. 7 and 8 showing side elevational views of the rotating body 104. The rotating body 104 is comprised of a first rotating body 104A and a second rotating body 104B, the first rotating body 104A is provided with a push-out member 107 together with the engagement piece 103, and the second rotating body 104B is provided with a lock member 106 and a protrusion piece 114.

The push-out member 107 shifts between a push-out position for pushing out the cassette in a removing direction and a retracted position corresponding to rotation of the first rotating body 104A.

The lock member 106 shifts between a lock position and a lock release position corresponding to rotation of the second rotating body. Further, the protrusion piece 114 comes into contact with a stopper 115 fixed to the cassette when the second rotating body 104B rotates in a clockwise direction in the figure.

The first rotating body 104A and the second rotating body 104B are stacked and disposed to be rotatable on a shaft 107 penetrating respective shaft holes. On mutually contacting surfaces, along the rotating direction, a plurality of tapers 108 is formed in the first rotating body 104A, and a plurality of tapers 109 is formed in the second rotating body 104B. The tapers 108 and 109 are opposite in the inclined direction, mesh with each other and are coupled. Then, in a state (FIG. 7) in which a rise portion 108A of each taper 108 engages in a rise portion 109A of each taper 109, when one of the first rotating body 104A and the second rotating body 104B rotates in a direction for maintaining the engagement state between the rise portion 108A and the rise portion 109A, the other body is interlocked and rotates.

Therefore, when one of the first rotating body 104A and the second rotating body 104B rotates in a direction for releasing and separating the engagement between the rise portion 108A and the rise portion 109A (FIG. 8), the other one is not interlocked and continues to halt. Then, in the state in which the rise portion 108A and the rise portion 109A are separated from each other, even when one of the first rotating body 104A and the second rotating body 104B next rotates in the direction for closing the rise portion 108A and the rise portion 109A, the rotation force is not conveyed to the other one until separated rise portion 108A and rise portion 109A come into contact again and engage in each other.

In FIG. 4, a latch member 110 and catch member 111 are fixed to the main body of the thermal transfer printer B. The latch member 110 comprised of, for example, a pin protrudes in the vertical direction from the paper surface of the figure, and engages in the lock member 106, and the cassette is thereby locked in the thermal transfer printer B. The lock member 106 is biased in a clockwise direction in the figure to engage in the latch member 110 in a lock position by a first biasing member (not shown) such as a spring. The first biasing member may be provided to act directly on the lock member 106, or may be provided to act on the second rotating body 104B to provide the rotation force in the clockwise direction.

The catch member 111 catches the push-out member 107 proceeding to the push-out position by rotation of the first rotating body 104A, and provides the cassette with the counteracting force via the push-out member 107, and it is thereby made easy removing the cassette from the cassette insertion area of the thermal transfer printer B. In addition, the retracted position of the push-out member 107 is a position such that the push-out member 107 does not exert the force of pushing out the cassette with the cassette inserted, and may be separated from the catch member 111 as shown in FIG. 4, or may contact the catch member 111 unless the force of pushing out the cassette acts.

Action of the cassette attachment device according to the invention with the above-mentioned configuration will be described with reference to FIGS. 4 to 14.

FIG. 4 shows a state in which the grip member 100 is in the first position, the lock member 106 is located in the lock position and engages in the latch member 110, and the cassette is set and locked in the thermal transfer printer B.

Figure 5:
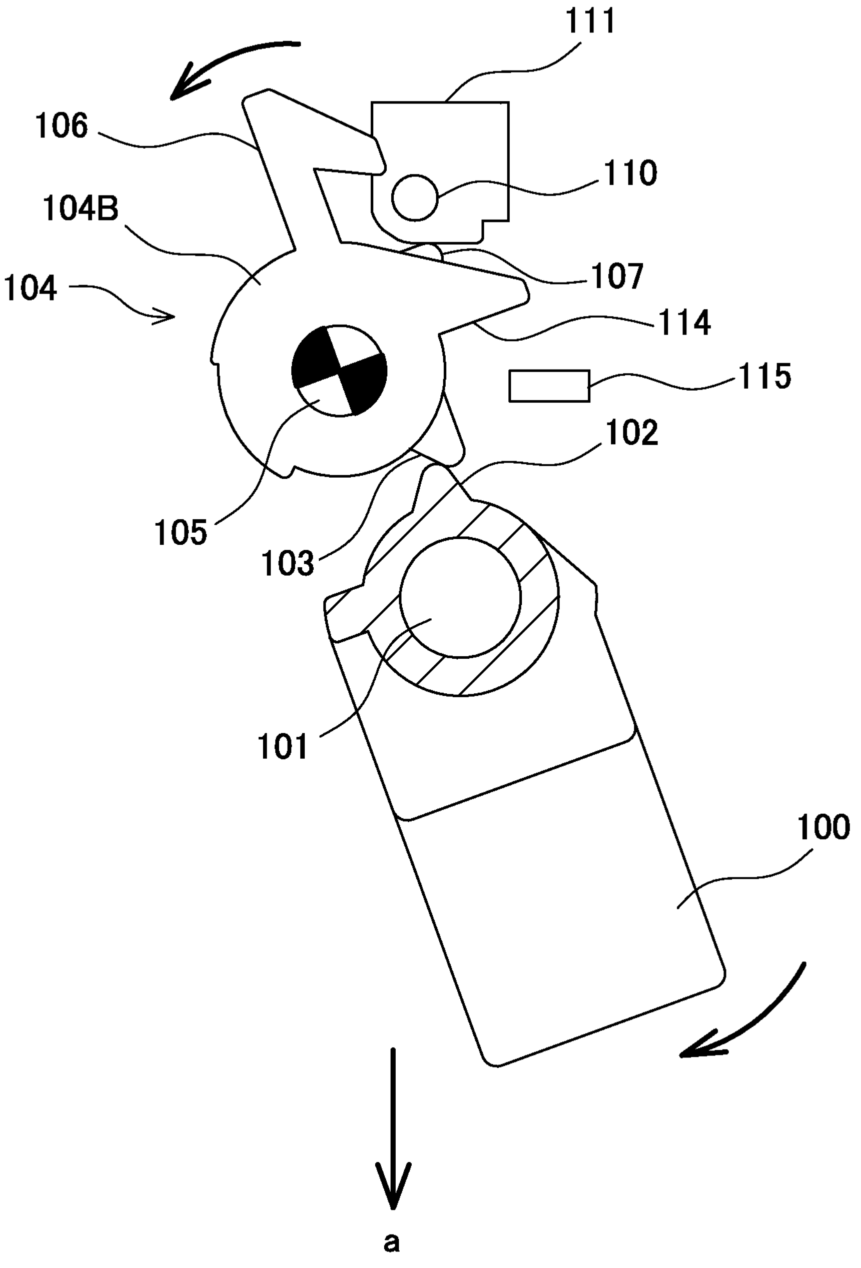
FIG. 5 is a plan view illustrating a state in which a lock release member is rotated from a first position to a second position from the state of FIG. 4.

FIG. 5 shows a state in which the grip member 100 is rotated to the second position by operation of the operator to pull out the cassette from the thermal transfer printer B. In this case, the protrusion portion 102 of the grip member 100 engages in the engagement piece 103 from the left direction as viewed in the figure to press, and rotates the first rotating body 104 in a counterclockwise direction (first direction) as viewed in the figure. Rotation of the first rotating body 104A in the counterclockwise direction in the figure is a state shown in FIG. 7 where the rise portion 108A of the taper 108 and the rise portion 109A of the taper 109 engage in each other, and therefore, the second rotating body 104B is interlocked and rotates. By this means, the lock member 106 shifts to the lock release position and separates from the latch member 110, and the lock of the cassette in the thermal transfer printer B is released. At the same time, by rotation of the second rotating body 104B, the push-out member 107 proceeds from the retracted position to the push-out position to come into contact with the catch member 111, and by the counteracting force, the cassette is biased in the removing direction (direction of the arrow a in the figure).

Figure 6:
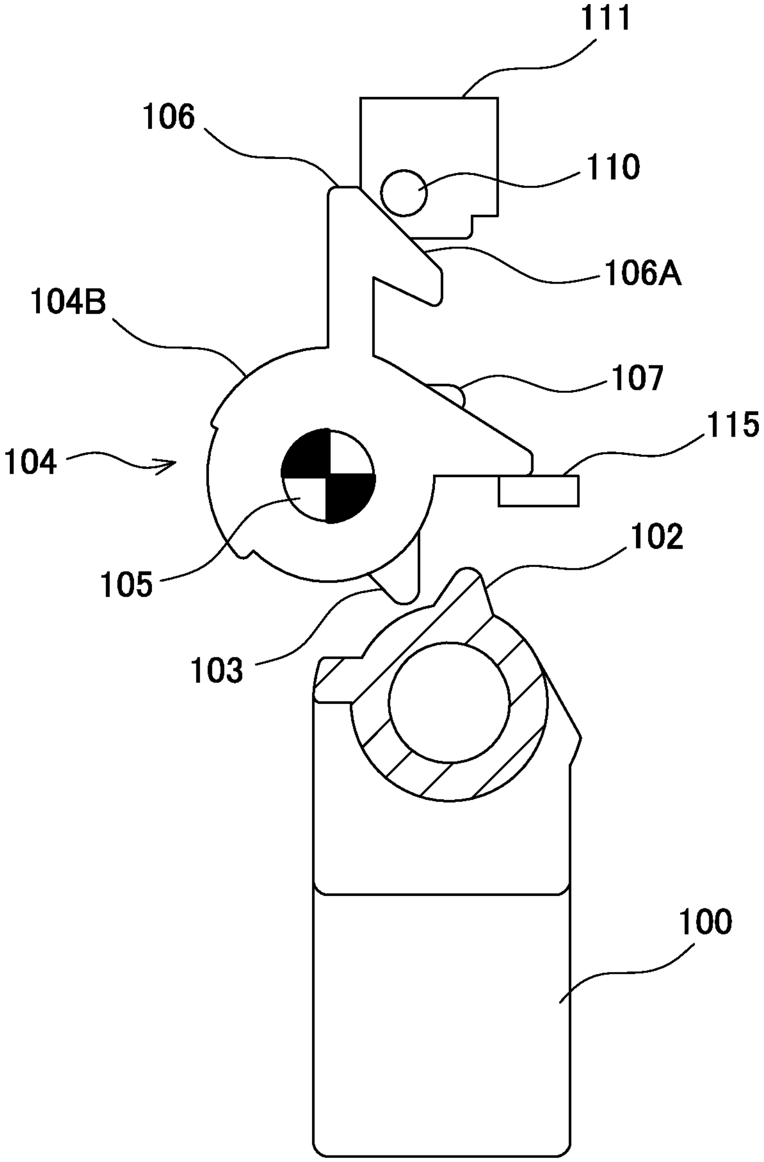
FIG. 6 is a plan view illustrating a state in which the lock release member is rotated to a third position further from the state of FIG. 5 and the lock is released.

Then, as shown in FIG. 6, when the grip member 100 arrives at the third position and rotation is finished, in the second rotating body 104B becoming free by not exerting the force on the first rotating body 104A, the lock member 106 biased by the first biasing member rotates in a clockwise direction (second direction) as viewed in the figure. At this point, since the cassette shifts in the removing direction by the counteracting force due to the contact between the push-out member 107 and the catch member 111, the lock member 106 neither engages nor is locked in the latch member 110. Then, the protrusion piece 114 of the first rotating body 104A comes into contact with the stopper 115 to halt rotation of the lock member 106.

Meanwhile, in rotation of the second rotating body 104B in the clockwise direction (second direction) in the figure, since the rise portion 108A of the taper 108 and the rise portion 109A of the taper 109 engage in each other, the first rotating body 104A also rotates in conjunction with the body 104B. By this rotation of the first rotating body 104A, the push-out member 107 separates from the catch member 111 in the push-out position and changes to the retracted position. Further, by rotation of the first rotating body 104A in the clockwise direction (second direction) in the figure, the position relationship between the engagement piece 103 and the protrusion portion 102 is swapped, and in other words, the engagement piece 103 is positioned to the left of the protrusion portion 102 as viewed in the figure. By this means, when the grip member 110 is next rotated from the second position to the first position, the protrusion portion 102 engages in the engagement piece 103 from the right direction in the figure to press, and is allowed to rotate the first rotating body 104A in the clockwise direction (second direction) in the figure.

Thus, the operator raises the grip member 100 to pull without any other motion, and is thereby capable of releasing the lock of the cassette and pulling out the cassette by the same operation, and removing of the cassette is made easy. Moreover, even though the counteracting force due to contact between the push-out member 107 and the catch member 111 is high, since the operator grasps the grip member 100, it is also possible to prevent the cassette from dropping.

Described next is the case of setting again the cassette that is pulled out of the thermal transfer printer B. When the grip member 100 that is the lock release member is in the third position, the protrusion portion 102 is not brought into contact with the engagement piece 103, and therefore, does not act on the lock member 106 and the push-out member 107. Accordingly, by inserting the grip member in the third position in the thermal transfer printer B, the lock by the lock member 106 and the latch member 110 is attained.

Figure 9:
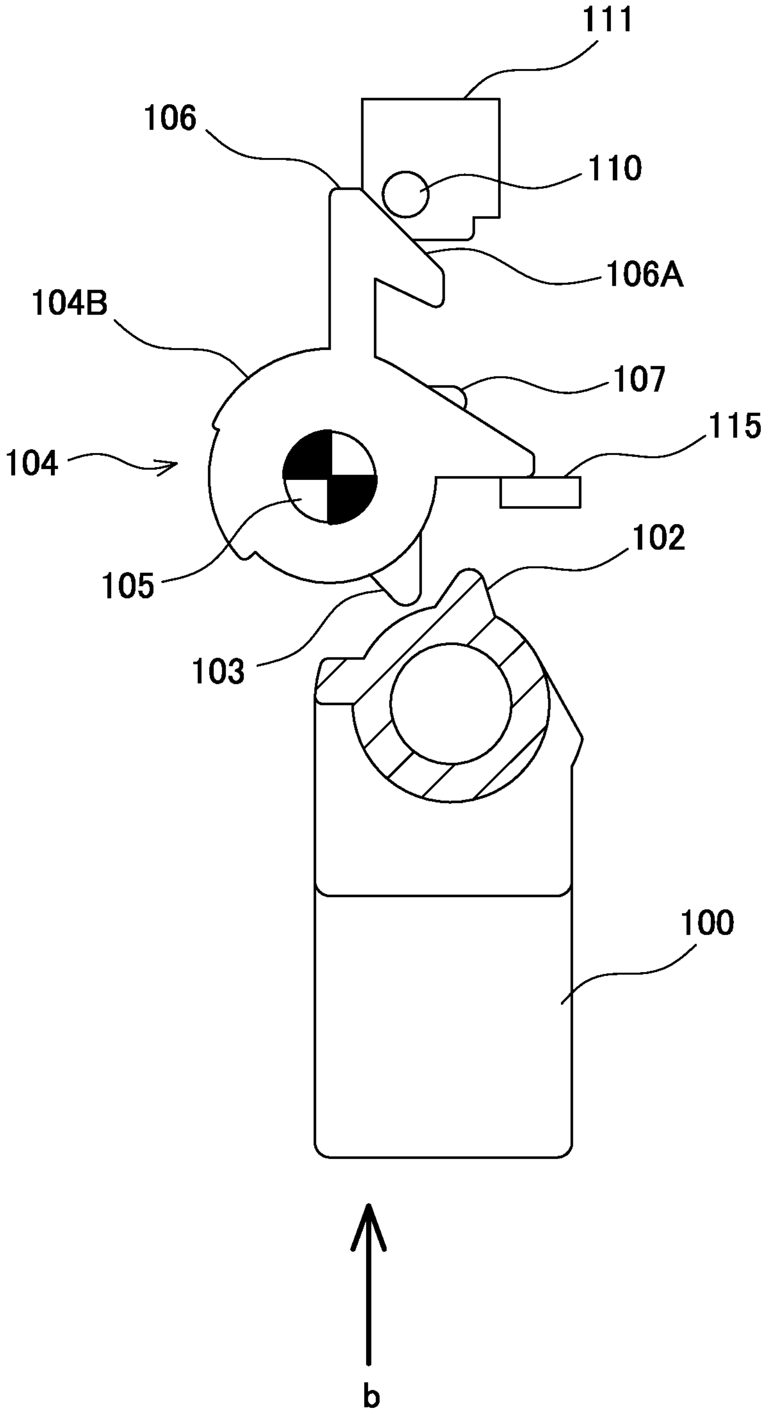
FIG. 9 is a view to explain action for inserting the cassette with the lock release member in the third position in a thermal transfer printer from the plan.
Figure 10:
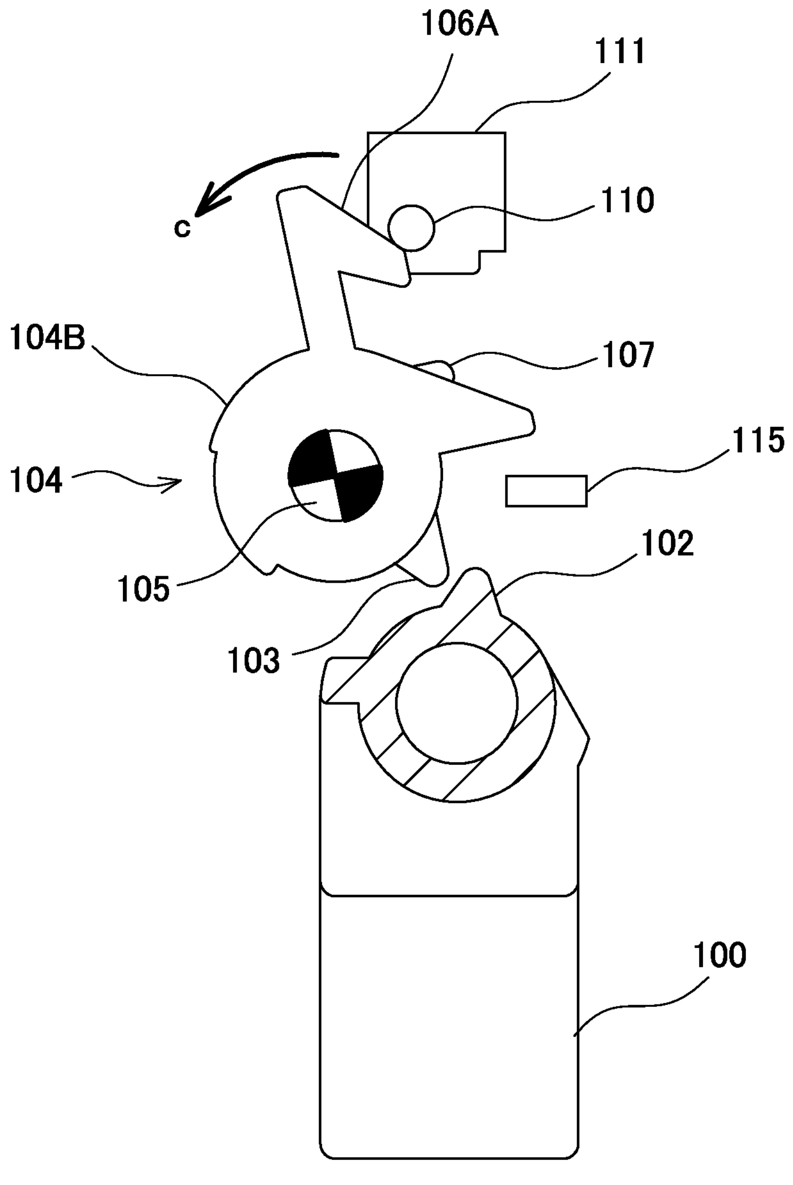
FIG. 10 is a view to explain action of the lock member in inserting the cassette with the lock release member in the third position in the thermal transfer printer from the plan.

As shown in FIG. 9, when the cassette is inserted into the cassette insertion area of the thermal transfer printer B in the arrow b direction, the front end portion of the lock member 106 strikes the latch member 110. An inclined portion 106A is formed on the side such that the lock member 106 contacts the latch member 110. When the cassette is inserted without any other motion, the latch member 110 slides the inclined portion 106A, and the lock member 106 escapes in the arrow c direction and rotates (FIG. 10).

By rotation of the latch member 110 in the arrow c direction, the second rotating body 104B rotates in a counterclockwise direction (first direction) as viewed in the figure. At this point, since motion of the first rotating body 104A is biased by a second biasing member (not shown) such as a spring so as to rotate in the counterclockwise direction (first direction) in the figure, when locking by the rise portion 109A of the taper 109 is released by the second rotating body 104B rotating in the counterclockwise direction, the first rotating body 104A follows the second rotating body 104B and also rotates in the same counterclockwise direction due to biasing of the second biasing member. Accordingly, the engagement between the rise portion 108A of the taper 108 and the rise portion 109A of the taper 109 is maintained. In addition, even when the push-out member 107 comes into contact with the catch member 111 during insertion of the cassette, since the grip member 100 is in the third position and does not act on the push-out member 107, only the first rotating body 104A rotates in a clockwise direction, the force in the removing direction does not act on the cassette, and it is possible to push the cassette in without any other motion.

Figure 11:
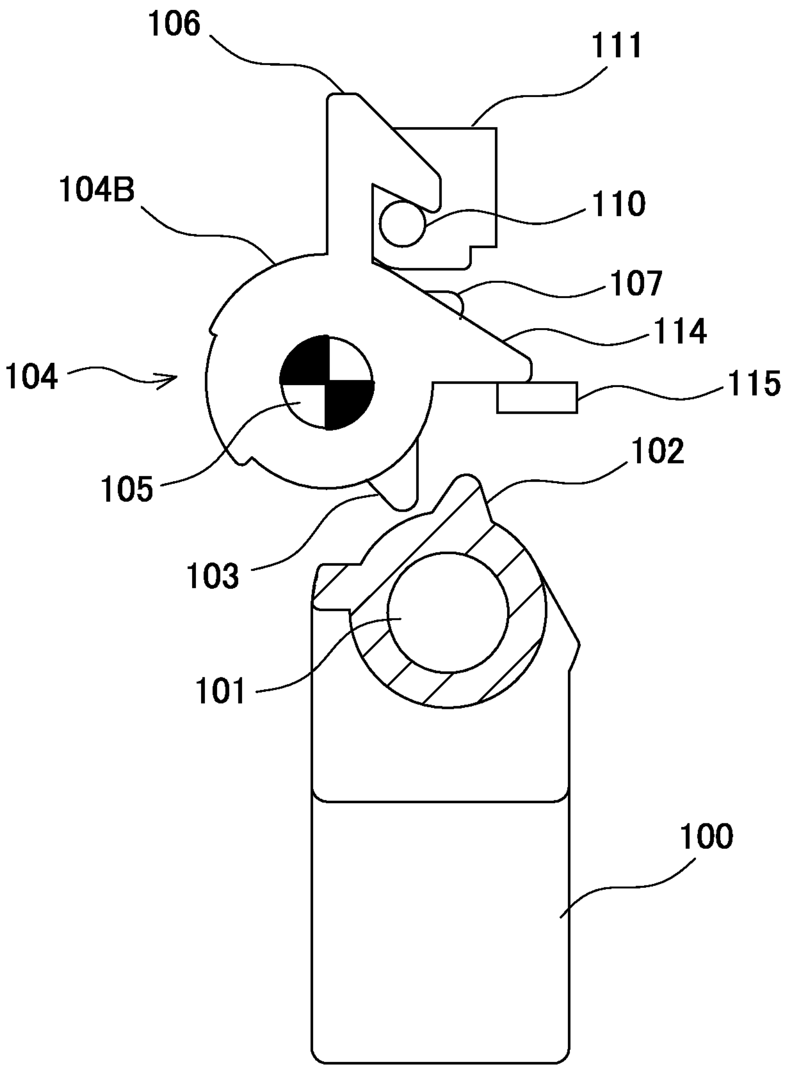
FIG. 11 is another view to explain action of the lock member in inserting the cassette with the lock release member in the third position in the thermal transfer printer from the plan.

Then, when the contact of the inclined portion 106A with the latch member 110 is released, the lock member 106 is returned by the biasing force of the first biasing member, shifts to the lock position and engages in the latch member 110 (FIG. 11). At this point, the second rotating body 104B rotates in a clockwise direction (second direction) as viewed in the figure, the engagement between the rise portion 108A of the taper 108 and the rise portion 109A of the taper 109 is maintained, and the first rotating body 104A also rotates in conjunction with rotation of the second rotating body 104B in the clockwise direction.

The cassette is thus inserted and locked in the thermal transfer printer B, the grip member 100 is in the third position in such a state as shown in FIG. 11, and therefore, it is necessary to rotate and return the grip member 100 to the first position. This corresponds to restoring to the initial state as shown in FIG. 4, and is preparation action required for the protrusion portion 102 to press the engagement piece 103 from the left in the figure in next releasing the lock. Further, as the card processing device 1, when the grip member 100 of the ribbon cassette 42 or the transfer film cassette 50 is in the state of rising from the surface of the housing 10 except the first position, it is not possible to close the front cover 1A, and it is intended not to perform action.

Rotation return operation of the grip member 100 from the third position to the first position may be performed manually or spring biasing, but is operation required to next release the lock as described previously, and is preferably performed automatically by spring biasing. Further, since rotation return to the first position of the grip member 100 is automatically performed by the operator inserting the cassette into the cassette insertion are of the thermal transfer printer B and getting the hand off, convenience is also improved.

Described is action when the grip member 100 rotates from the third position to the first position with the lock member 106 and the latch member engaged with each other. When the grip member 100 rotates to the first position from the state of FIG. 11, the protrusion portion 102 presses the engagement piece 103 from the right direction as viewed in the figure, and the first rotating body 104A rotates in the clockwise direction (second direction) in the figure. At this point, in rotation of the first rotating body 104A in the clockwise direction in the figure, the rise portion 108A of the 108 and the rise portion 109A of the taper 109 do not engage in each other, and separate from each other. Accordingly, at this point, the cassette is already inserted in the thermal transfer printer B, and the lock member 106 and the latch member 110 engage in each other, but the rotating body 104A rotates freely by rotation of the grip member 100.

Figure 12:
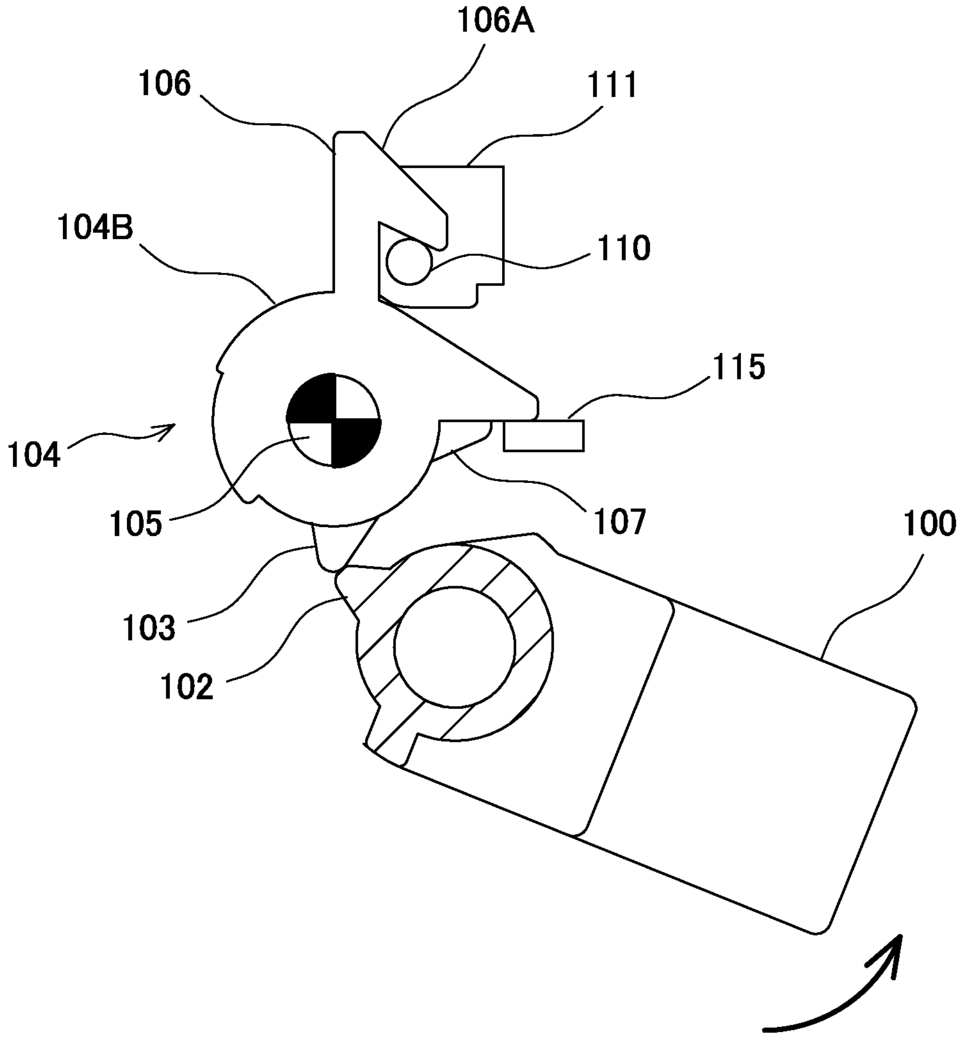
FIG. 12 is a view to explain a state in which the lock release member is rotated from the third position to the first position from the plan.

Then, in a state of FIG. 12 before rotation of the grip member 100 arrives at the first position, the engagement between the protrusion portion 102 and the engagement piece 103 is released, and the first rotating body 104A is biased by the second biasing member so as to rotate in the counterclockwise direction (first direction) in the figure as described previously, and therefore, by the biasing force, rotates in the counterclockwise direction (first direction). By this rotation, the engagement piece 103 returns to the position as shown in FIG. 4 in which the grip member 100 is in the first position. Further, when the first rotating body 104A starts to rotate in the counterclockwise direction in the figure, since the rise portion 108A of the taper 108 and the rise portion 109A of the taper 109 are in the state as shown in FIG. 8 and separate from each other, the first rotating body 104A only rotates, and when the rise portion 108A of the taper 108 of the first rotating member 104A comes into contact with and the rise portion 109A of the taper 109 of the second rotating body 104B, stops the rotation.

Thus, when the grip member 100 in the third position is returned to the first position after locking, by the above-mentioned series of motion of the first rotating body 104A, the engagement piece 103 is positioned to the right of the protrusion portion 102 in the figure, and the position relationship between the engagement piece 103 and the protrusion portion 102 is swapped again, and is capable of returning to the state of FIG. 4.

Accordingly, when the grip member 100 is next rotated from the first position to the second position, the protrusion portion 102 presses the engagement piece 103 from the left direction as viewed in the figure, the first rotating body 104A rotates in the counterclockwise direction (first direction) in the figure, the engagement between the lock member 106 and the latch member 110 is thereby released as described previously, and the lock is released.

In such cassette insertion operation, when the grip member 100 keeps the state of the third position, the operator is easier to operate insertion. However, the grip member 100 is rotatable, and thereby swings by the weight of the cassette body, and it becomes burdensome operation inserting the cassette while holding the grip member 100 in the third position. Therefore, the cassette attachment device according to the invention has a configuration for enabling the grip member 100 to be kept in the third position stably, when the operator grasps the grip member 100 and holds the cassette to insert in a state in which the grip member 100 is in the vertical direction.

Figure 13:
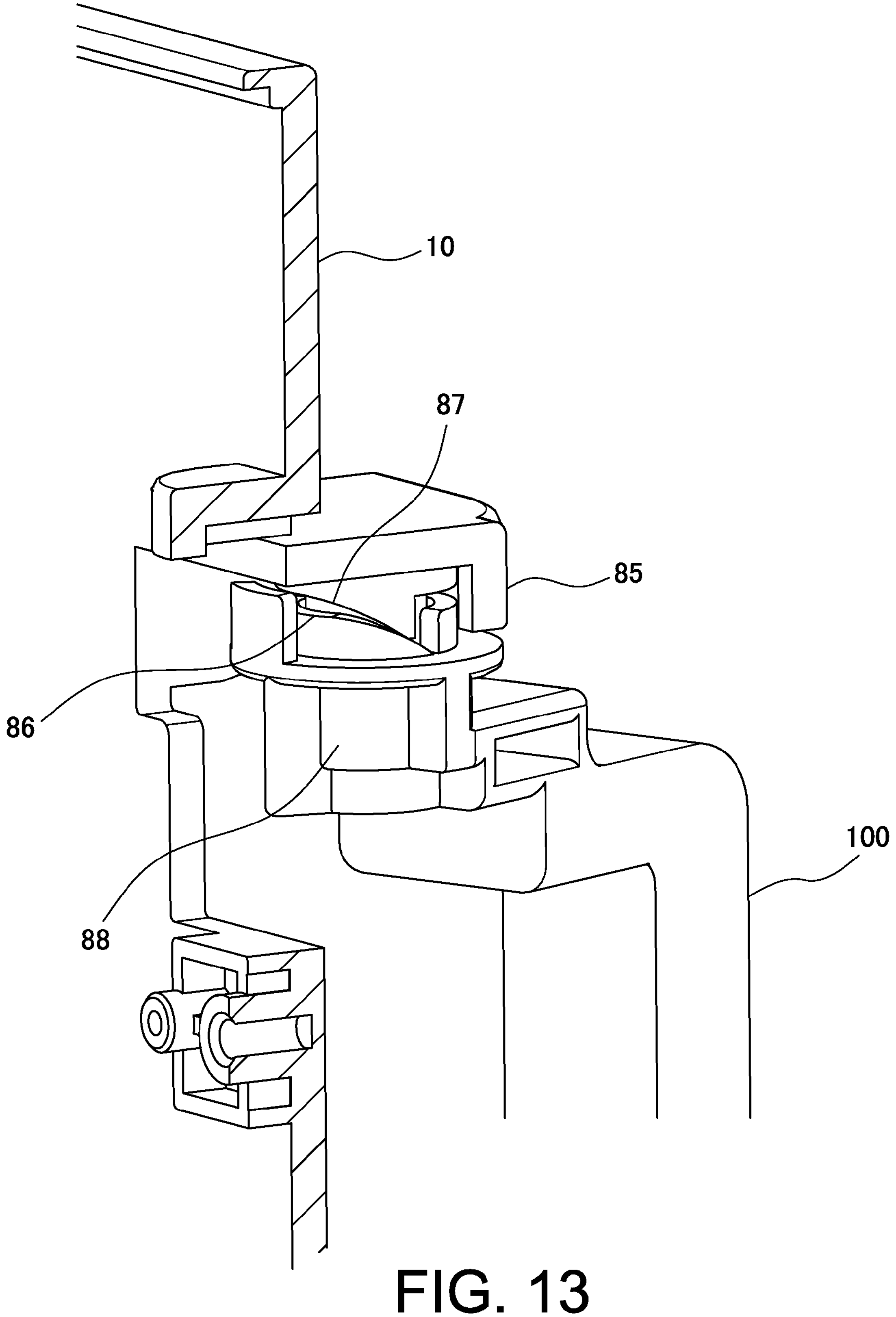
FIG. 13 is a view to explain coupling between the lock release member and a housing of the cassette.
Figure 14:
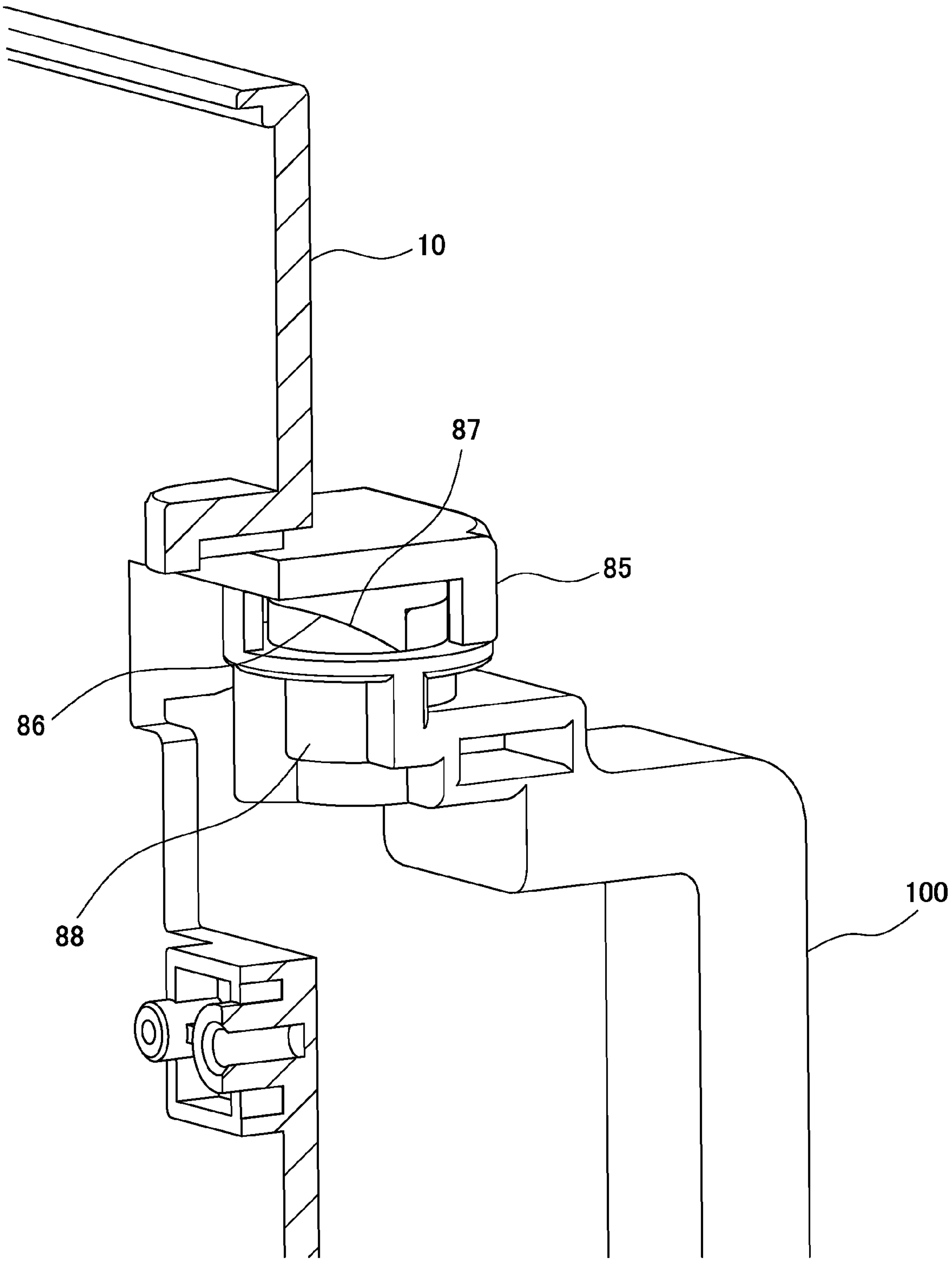
FIG. 14 is a view to explain a state of coupling to the housing of the cassette when the lock release member is in the third position.

In other words, as shown in FIGS. 13 and 14, the shaft 88 penetrates a coupling portion 85 that couples the grip member 100 and the housing 10 of the cassette, and the grip member 100 is axially supported by the shaft 88 to be rotatable. Then, in the coupling portion 85, tapers 86 and 87 with inclined directions being mutually opposite are formed on the surfaces on which the grip member 100 and the housing 10 contact each other, respectively. In the state the posture of the cassette as shown in the figures in which the grip member 100 is in the vertical direction, the tapers engage in each other by the weight of the cassette body, and the grip member 100 is thereby in a stable state in the third position.

Accordingly, when the operator inserts the cassette in the thermal transfer printer B while holding the grip member 100 with the hand, the housing 10 of the cassette does not become unsteady with respect to the grip member 100, and insertion of the cassette is made easy. In addition, as described previously, in the case of configuring that the spring member is provided to forcibly return the grip member 100 from the third position to the first position, the force of rotating under the weight of the cassette body is required to be stronger than biasing of the spring member.

In the above-mentioned cassette attachment device, it is possible to concurrently perform both release of the lock and removal by rotating the grip member 100 in the first position to the second position, it is further possible to perform insertion and lock by pushing in the thermal transfer printer B in insertion, and the convenience is extremely high. Accordingly, the device is significantly effective in the case of handling large-size cassettes.

In the above-mentioned description, the present invention is described using the Embodiment in which the thermal transfer printer is the device body, but is capable of being carried into practice in various types of printers as well as the thermal transfer printer, as long as the device has a cassette. Further, even when the device body is a thermal transfer printer, the device is not limited to a thermal transfer printer used in a card processing device.

Described next is an internal configuration (particularly, spool holding portion) of the film cassette such as the transfer film cassette 50 and the ribbon cassette 42. The configuration will be described below using the transfer film cassette 50, and as a matter of course, is similarly applicable to the ribbon cassette 42 and other film cassettes.

[Configuration of the Film Cassette]

Figure 15:
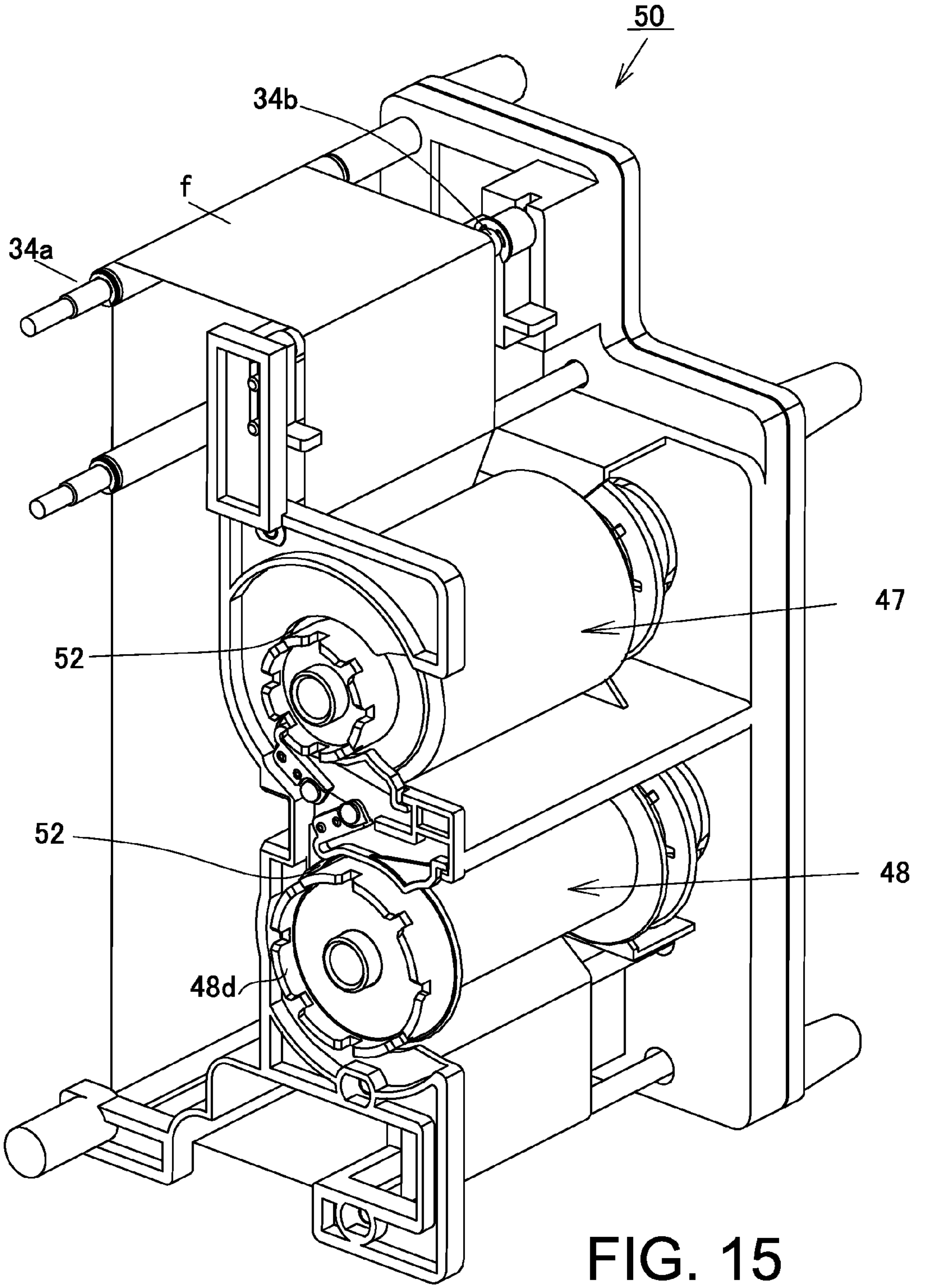
FIG. 15 is a perspective view illustrating an insertion state of a film cassette in a device of FIG. 1.

The transfer film cassette 50 (hereinafter, referred to as a "film cassette") loaded with the transfer film 46 is attached to the device housing 2 to be attachable and detachable. As described in FIG. 2, the front cover is disposed on the front side in FIG. 1 to be openable and closable, and the film cassette 50 is attached and detached to/from the device frame from the front cover. As shown in FIG. 15, the film cassette 50 is loaded with a supply spool 47 and wind spool 48 to be attachable and detachable in a unit frame. Then, the film cassette 50 is inserted in the device frame to be attachable and detachable.

[Spool Shape]

Figure 16:
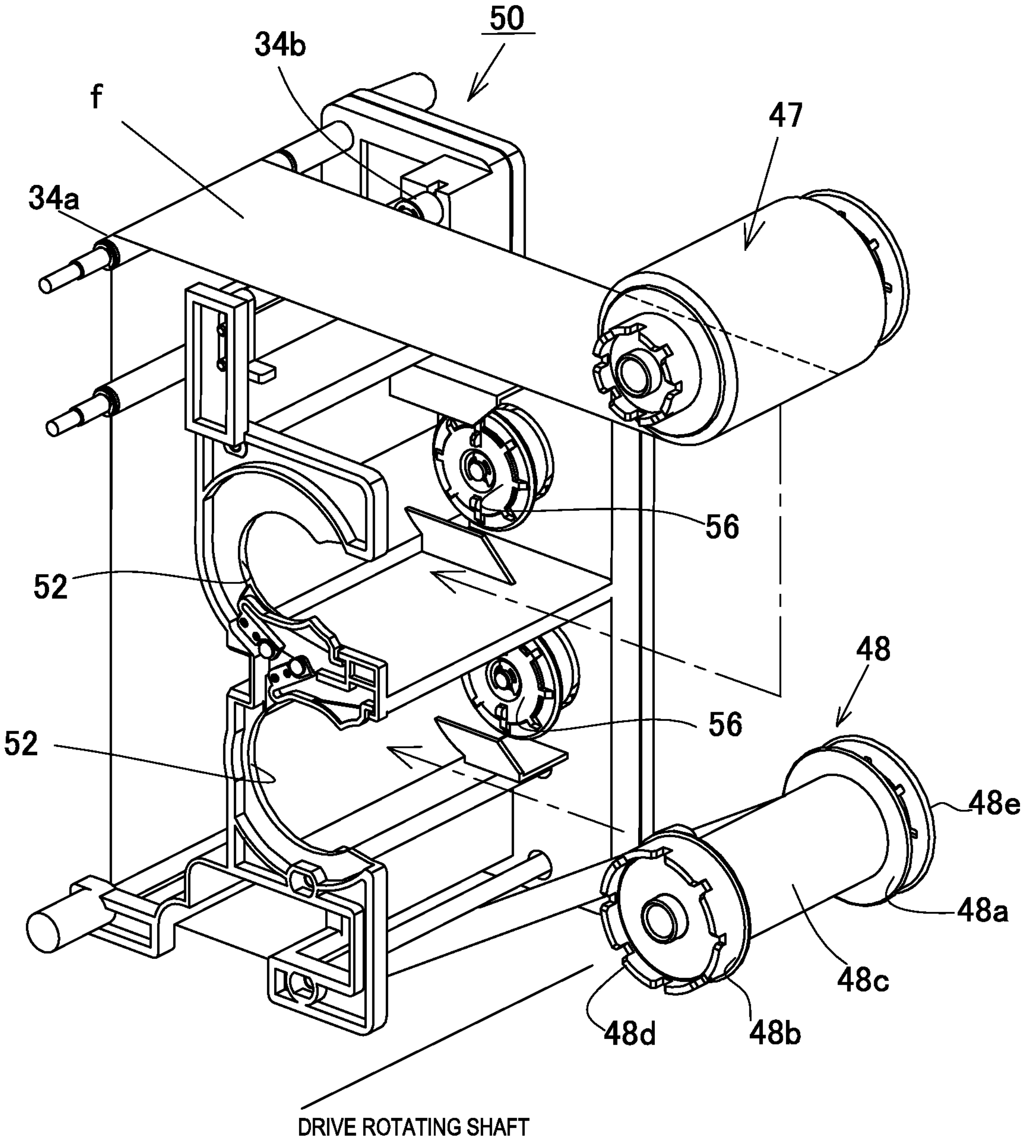
FIG. 16 is an exploded perspective view of a film cassette of FIG. 2.

The supply spool 47 and wind spool 48 have the same structure, and the transfer film 46 is wound around a film winding portion. Described is the structure of the wind spool 48 as shown in FIG. 16. A winding portion (winding barrel) 48*c* is formed in between a pair of right and left fringes 48*a*, 48*b*. Then, in the wind spool 48, a drive coupling portion 48*d* is formed at one end portion, and a coupling engagement portion 48*e* is provided at the other end portion.

The drive coupling portion 48*d* has an engagement concave portion that engages in a transmission hub of the drive rotating shaft. Further, the coupling engagement portion 48*e* has an engagement surface that engages in a coupling member, described later, and an engagement protrusion 48*g* (see FIG. 17(*a*)) is formed on the engagement surface. The engagement protrusion 48*g* is to rotate the spool integrally in manually rotating the coupling member. In addition, the supply spool 47 is formed of the same structure as the wind spool 48.

Described is a structure for inserting the spools in the film cassette 50. As shown in FIGS. 15 and 16, the film cassette 50 is provided with bearing portions 52 that support the spool end portions and coupling means 53. The description will be given with reference to FIG. 16, and the bearing portions 52 that support one end portions (left end portions in FIG. 16) of the spools 47 and 48 are disposed opposite the supply spool 47 and wind spool 47, respectively. Each of the bearing portions 52 is in a semicircular shape (shape of a U), and fit-supports the fringe of the drive coupling portion 48*d* of the spool.

Each of the other end portions (right end portions in FIG. 16) of the spools 47, 48 is supported by the coupling means 53 disposed in the film cassette 50. The coupling means 53 is comprised of a shaft member 55, a coupling member 56 attached to the shaft member to be able to shift in the axis direction, and a bias spring 57 that biases the member 56 in a spool coupling direction.

Figure 17A:
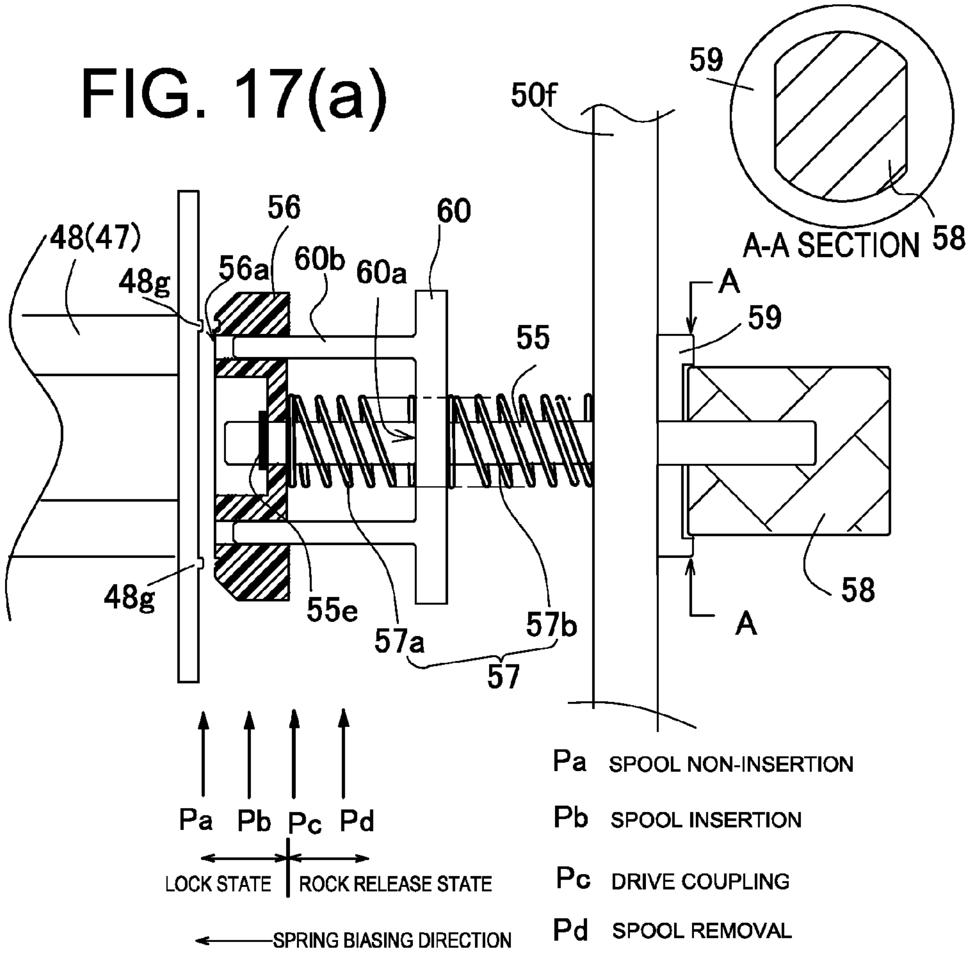
FIG. 17 illustrates a state of insertion of a spool into the film cassette, where FIG. 17(*a*) shows a non-insertion state, and FIG. 17(*b*) shows an insertion state.
Figure 17B:
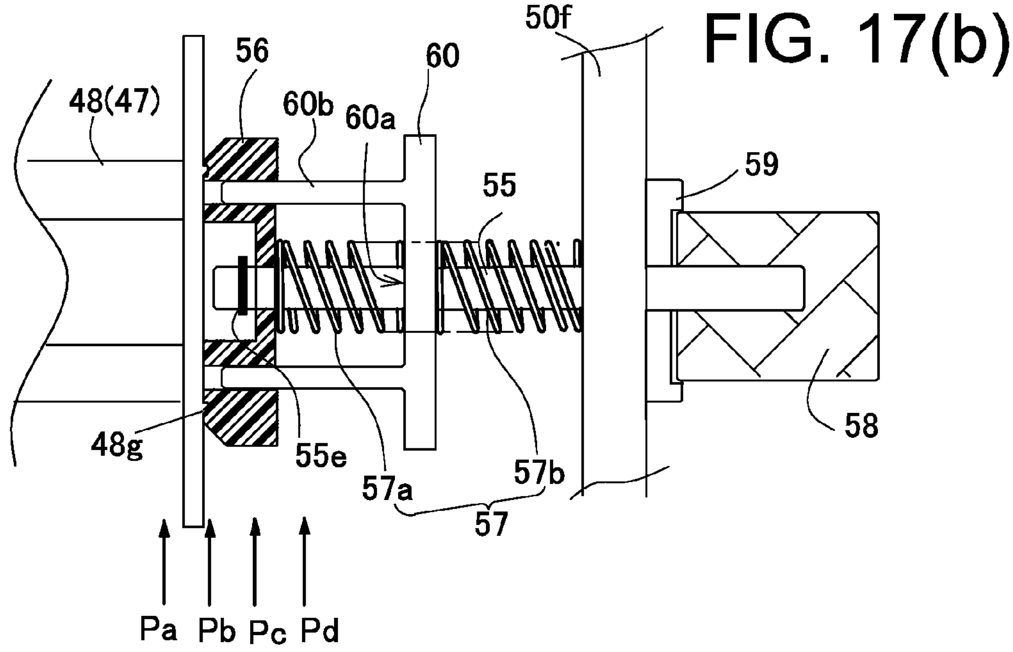

As shown in FIG. 17, on a side frame 50*f* of the film cassette 50, the shaft member 55 is axially supported rotatably. The shaft member 55 is cantilever-supported by the cassette side frame 55*f* to be rotatable. Then, the coupling member 56 is attached to the shaft member 55 to be able to shift in the axis direction. The coupling member 56 is formed in the shape of a circular plate having an engagement surface 56*a* that engages in one end surface of the spool, is freely fitted into the shaft member 55 that supports the member 56, and is configured to be able to shift in the axis direction.

In addition, the coupling member 56 is provided with a taper 56*b*. By this means, since the spools 47, 48 are inserted in the direction orthogonal to the shift direction of the coupling member 56 (the dashed-line arrow in FIG. 16), the coupling members 56 are capable of engaging in the spools 47, 48 after once retracting.

In addition, the coupling member 56 is essentially required to be able to shift in the axis direction of the spool, and may be configured to be fixed to the shaft member 55 so that both members are able to shift in the axis direction integrally.

As described above, in the coupling member 56, the bias spring 57 that biases in the spool coupling direction (left direction in FIG. 17(*a*)) is provided between the member 56 and the cassette side frame 50*f*. The bias spring 57 shown in the figure is comprised of two separate springs 57*a*, 57*b* due to the structure, and is capable of being comprised of one spring. An E type ring 55*e* (that may be a protrusion) is provided in the shaft member 55, and functions as a left-limit stopper that locks the coupling member 56 biased by the bias spring 57.

The shaft member 55 is provided with an operating member 58 that separates the coupling member 56 from the spool end portion, and a lock member 59 that inhibits rotation of the coupling member, as described below. First, the operating member 58 is comprised of an operating knob integrally provided in the shaft member 55. Then, when the operating knob 58 shifts in the right direction in FIG. 17, the coupling member 56 also shifts to the right side in FIG. 17 by action of the E type ring 55*e*. By this means, the coupling member 56 separates from the spool end portion.

The lock member 59 is comprised of a mechanism that inhibits rotation of the shaft member 55 or the operating member 58, and in the member as shown in the figure, the lock member integral with the shaft member that locks the operating member 58 is integrally attached to the cassette side frame 50*f*. The position relationship will be described later, and the lock member 59 having a fit groove 59*a* that locks rotation of the operating member (operating knob) 58 is integrally attached to the cassette side frame 50*f*.

Accordingly, when the shaft member 55 shifts in the right direction in FIG. 17 against the bias spring 57 by the operating member 58, the fit between the operating member 58 and the lock member 59 is released, and the shaft member 55 becomes rotatable. Further, in a non-operation state of the operating member 58, the operating member 58 is fitted and locked in the lock member 59 by action of the bias spring 57.

Thus, position control of the shaft member 55 allows the lock state for inhibiting rotation and the lock release state for permitting rotation.

Therefore, a joint member 60 that integrally rotates is provided in between the shaft member 55 and the coupling member 56. The shaft member 55 and the coupling member 56 are capable of being integrally fixed, but in the device as shown in the figure, the coupling member 56 is freely fit to move in the axis direction along the shaft member 55. Hence, the hub-shaped joint member 60 is integrally fixed (a base end portion 60*a* is press-fixed into the shaft member 55) to the shaft member 55, and one end 60*b* of the joint member 60 is fitted into the coupling member 56 slidably.

Thus configured coupling member 56 is positioned in a left-limit position Pa shown in FIG. 17(*a*) by action of the bias spring 57. This state (initial state) is a spool non-insertion position in which the coupling member 56 strikes the left-limit stopper (E type ring) 55*e* by the bias spring 57. In the first position Pa, a span from the bearing portion 52 on the spool other end side is set to be shorter than a span of the spools 47, 48. Further, when the coupling member 56 is in the first position Pa, the lock member 59 and the operating member 58 are fitted as the state of FIG. 17(*a*), and in a lock state in which rotation is inhibited.

Next, when the operator shifts the coupling member 56 to a second position Pb against the bias spring 57 and inserts the spool, as shown in FIG. 17(*b*), the coupling member 56 shifts along the shaft member 55, and the engagement surface 56*a* engages in the spool end surface. In this state, the shaft member 55 is maintained at the initial state, and the lock member 59 and the operating member 58 are fitted, and are put in the lock state in which rotation is inhibited.

Thus, the coupling member 56 is held at the lock state in which rotation is inhibited by the lock member 59 in the first position Pa (initial state; spool non-insertion) and the second position Pb (spool insertion state).

Figure 18A:
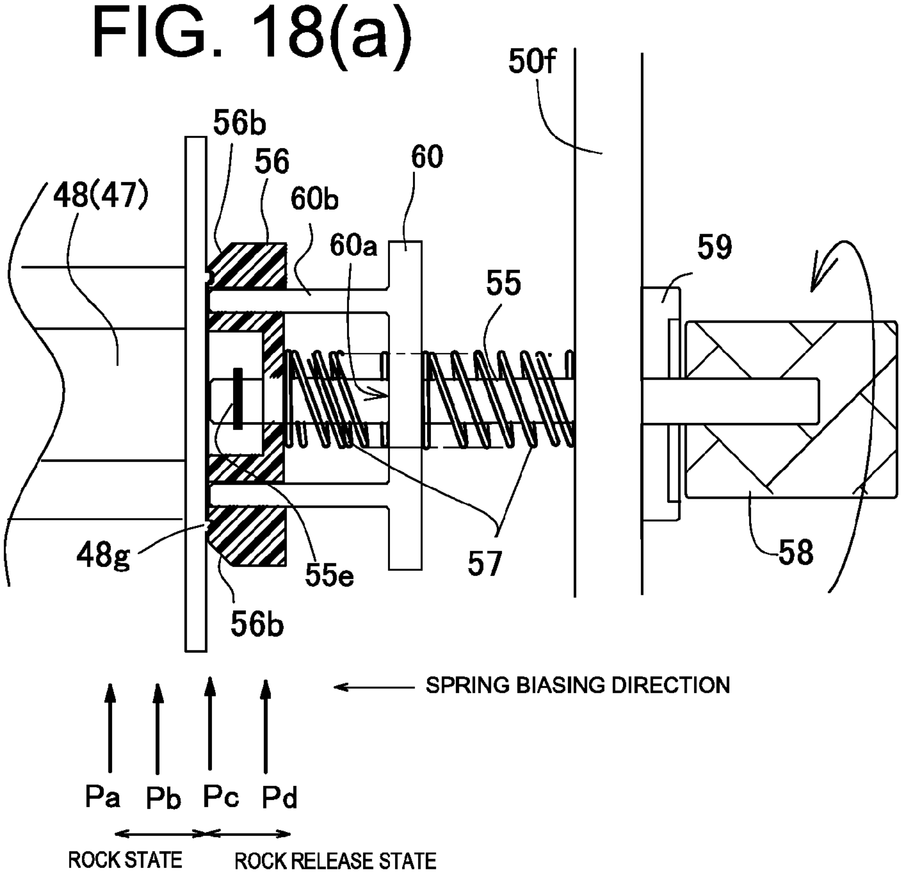
FIG. 18 illustrates the state of insertion of the spool into the film cassette, where FIG. 18(*a*) shows a lock release state, and FIG. 18(*b*) shows a separate state.
Figure 18B:
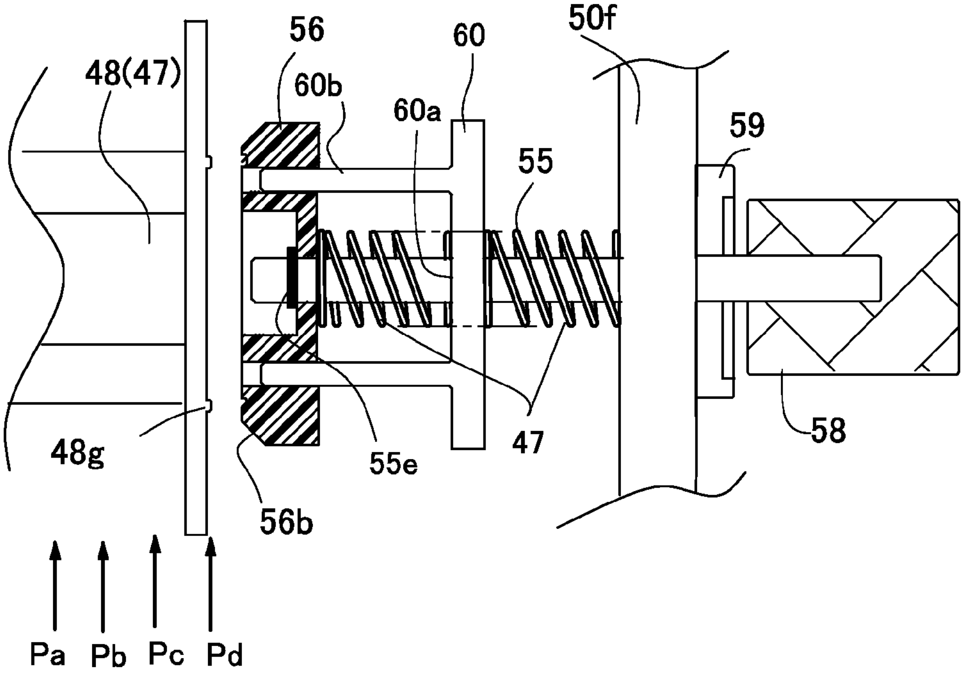

At this point, for example, when insertion of the spool 47 or 48 is erroneous (operation mistake), the operator pulls out the operating member 58 to the right side as viewed in the figure, shifts the coupling member 56 to a spool separate position (fourth position) Pd, obtains the state of FIG. 18(*b*), and is capable of removing the spool from the coupling member 56. Further, when the slack occurs in the transfer film 46 during the process of inserting the spool, the operator pulls out the operating member 58 to the right side as viewed in the figure, and shifts the coupling member 56 to a lock release position (third position) Pc. Then, the engagement between the lock member 59 and the operating member 58 is released (the lock is released) as the state of FIG. 18(*a*), and the shaft member 55 becomes rotatable. Then, the operator rotates the operating member 58 to the arrow direction in the figure, and is thereby capable of rewinding the film.

In addition, in the film cassette 50, with the cassette inserted in the device frame, a drive rotating shaft (not shown) on the device side engages in the drive coupling portion 48*d* of the spool. At this point, the spool shifts by being pushed by the drive rotating shaft on the device side, and the coupling member 56 shifts to the third position Pc. By the coupling member 56 shifting, apart (not shown) of the coupling member 56 engages in the joint member 60, and by pushing the joint member 60, the shaft member 55 shifts to the right side in the figure. In addition, the spool may directly engage in the joint member 60 to shift the shaft member 55. Then, the engagement between the lock member 59 and the operating member 58 is released (the lock is released) as the state of FIG. 18(*a*), and the spool rotates by the drive rotating shaft on the device side.

Thus, in the film cassette 50, the shaft member 55 is equipped with the coupling member 56 and the operating member 58, and the coupling member 56 is shifted to the first position Pa (spool non-insertion), second position Pb (spool insertion), third position Pc (drive coupling) and fourth position Pd (spool removal). Then, it is a feature that the first and second positions Pa, Pb are of the lock state of inhibiting rotation of the coupling member 56, and that the third and fourth positions Pc, Pd are of the lock release state.

Figure 19A:
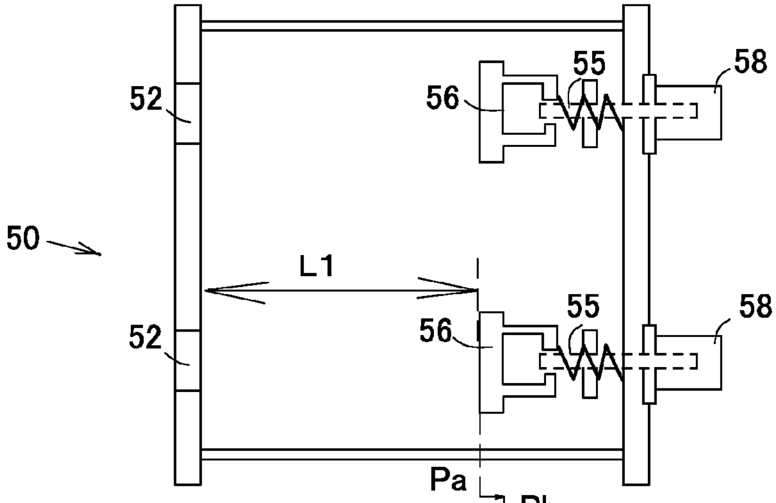
FIG. 19 contains action explanatory views of coupling means, where FIG. 19(*a*) shows a state of being removed from the device, FIG. 19(*b*) shows a state of being inserted in the film cassette, and FIG. 19(*c*) is a view of a state of being inserted in a device frame.
Figure 19B:
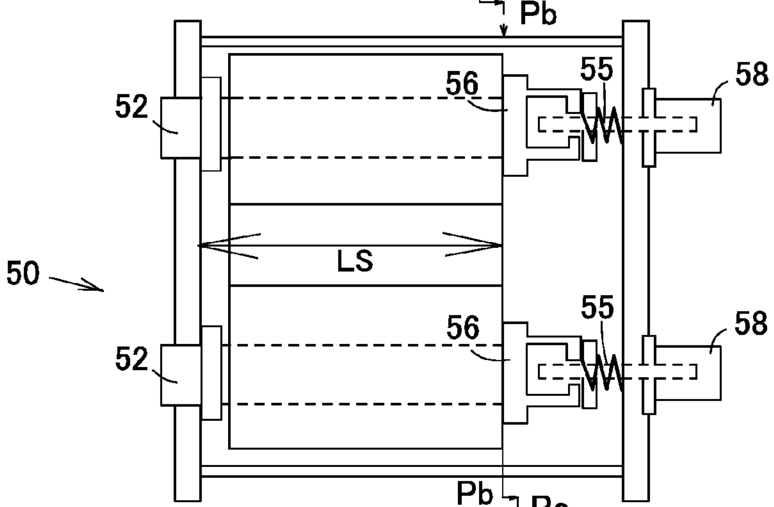
Figure 19C:
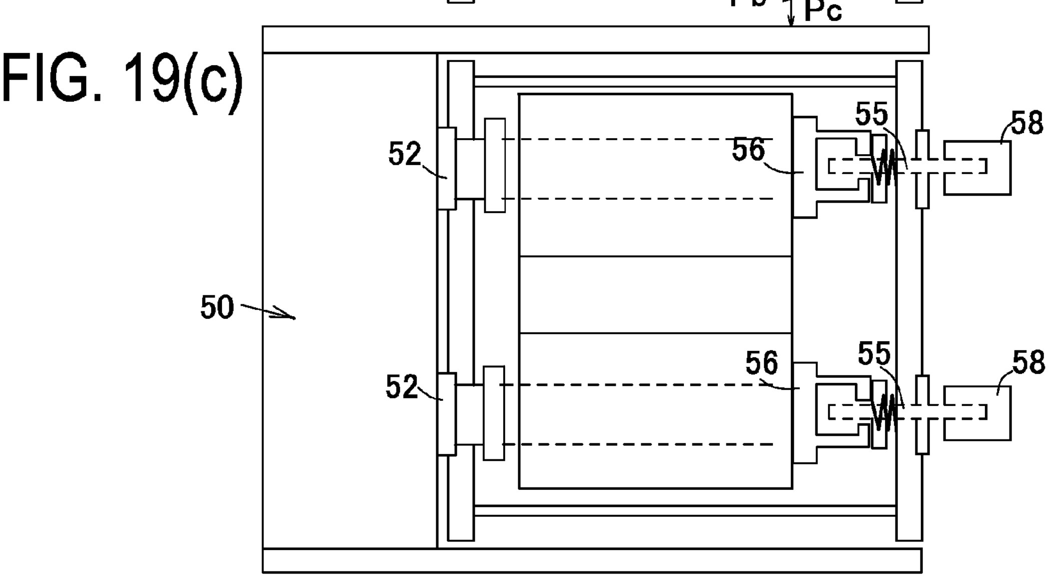

Action of the above-mentioned coupling means will be described next based on FIG. 19. FIG. 19(*a*) shows a state in which the film cassette 50 is removed from the device, and any spool is not inserted on either of the supply side and the winding side. The coupling member 56 is acted upon by the bias spring 57 and is locked in the stopper (E type ring 55*e*). In this state, a span L1 between the bearing portion 52 and the coupling member 56 is set to be shorter than a span LS of the spool. The coupling member 56 in this state is held at the lock state of FIG. 17(*a*).

Accordingly, in the state of FIG. 19(*a*), rotation of the coupling member 56 is inhibited, and it is made easy performing operation for attaching the spool around which the film is wound to between the bearing portion 52 and the coupling member 56.

FIG. 19(*b*) shows a state in which the spools are inserted in the film cassette 50, and in the wind spool 48 and the spool 47 on the winding side, one end is supported by the bearing portion 52 of the cassette, while the other end is supported by the coupling member 56. The coupling member 56 and the spool end surface are press-fixed by the bias spring 57. At this point, the coupling member 56 is held at the lock state of FIG. 17(*b*). Accordingly, in attaching the spool around which the film is wound, the coupling member 56 neither rotates nor to cause the film to slack.

FIG. 19(*c*) shows a state in which the film cassette 50 loaded with wind spool 48 and the supply spool 47 is inserted in the device. At this point, the coupling member 56 is coupled to the drive rotating shaft on the device side, and by this coupling, the shaft member 55 becomes the lock release state of FIG. 18(*a*). Accordingly, by controlling rotation of the drive rotating shaft on the device side, it is possible to feed the film.

Further, in the state (state before the cassette is inserted in the device) of FIG. 19(*b*), by shifting (pulling out) the operating member 58 to the position (third position Pc) of FIG. 18(*a*), it is possible to rewind the film slack occurring in inserting the spools.

In addition, not shown in the figure, but in the state in which the spools with the film wound are inserted in the film cassette 50 of FIG. 19(*b*), by shifting the operating member 58 to the fourth position Pd (see FIG. 18(*b*)), for example, it is possible to remove the used wind spool 57 from the film cassette 50 easily.

Concurrently therewith, as compared with the conventional configuration for inserting the spool in the device body while cantilever-supporting on the coupling member side, in the cassette of this Embodiment, the opposite end portions of the spool are axially supported by the cassette, and it is thereby possible to insert the film in the device body with the correct posture. In view of the above-mentioned description, it is possible to perform insertion and removal of the spool, inhibition of rotation and slack removing rotation with simplified operation.

In addition, this application claims priority from Japanese Patent Application No. 2010-165320 and Japanese Patent Application No. 2011-057588 incorporated herein by reference.

DESCRIPTION OF SYMBOLS

B Device body (thermal transfer printer)
10 Housing
33 Heat roller
46 Transfer film
47 Wind spool
48 Supply spool
48*a* Fringe
48*b* Fringe
48*c* Winding portion (winding barrel)
48*d* Drive coupling portion
48*e* Coupling engagement portion
48*g* Engagement protrusion
49 Carry roller
50 Film cassette
50*f* Side frame
51 Unit frame
52 Bearing portion
53 Coupling means
55 Shaft member
55*e* E type ring (left-limit stopper)
56 Coupling member
56*a* Engagement surface
56*b* Taper
57 Bias spring (57*a*, 57*b*)
58 Operating member (part of lock means)
59 Lock member (part of lock means)
59*a* Fit groove
60 Joint member
60*a* Base end portion
60*b* One end portion
Pa Left-limit position (first position) (non-insertion position)
Pb Second position (insertion position)
Pc Third position (drive coupling position)
Pd Fourth position (removal position)
85 Coupling portion
86 Taper formed in the grip member in the coupling portion
87 Taper formed in the housing in the coupling portion
100 Lock release member (grip member)
102 Protrusion portion
103 Engagement piece
104 Rotating body
104A First rotating body
104B Second rotating body
106 Lock member
106A Inclined portion
107 Push-out member
108 Taper of the first rotating body
108A Rise portion of the taper of the first rotating body
109 Taper of the second rotating body
109A Rise portion of the taper of the second rotating body
110 Latch member
111 Catch member

The invention claimed is:

1. A cassette attachment device comprising:
a device body including a catch member, and
a cassette comprising:
a housing detachably attached to the device body;
a lock member attached to the housing, the lock member shifting between a lock position to lock the cassette inserted in the device body and a lock release position to release the lock to remove the cassette from the device body;
a push-out member associated with the lock member, the push-out member shifting between a push-out position to contact the catch member of the device body and to push out the cassette in a removing direction when the lock member is in the lock release position, and a retracted position separated from the catch member; and
a lock release member coupled to the lock member and the push-out member to shift from a first position to a second position, the lock release member being a grip member rotatably provided on the housing of the cassette,
wherein when the lock release member shifts from the first position to the second position, the lock member shifts from the lock position to the release position, and
the push-out member shifts from the retracted position to the push-out position.

2. The cassette attachment device according to claim 1, wherein the lock release member is configured to be able to shift to a third position of not acting on the lock member and the push-out member after shifting from the first position to the second position.

3. The cassette attachment device according to claim 2, wherein it is configured that the push-out member shifts in a first direction by the lock release member shifting from the first position to the second position, and the push-out member shifts in a second direction by the lock release member shifting from the third position to the first position,
the push-out member and the lock member concurrently shift when the push-out member shifts in the first direction, and
only the push-out member shifts when the push-out member shifts in the second direction.

4. A cassette attachment device comprising:
a device body including a catch member, and
a cassette attachable and detachable to the device body, the cassette comprising:
a lock member capable of shifting between a lock position for locking the cassette inserted in the device body and a lock release position for releasing the lock to enable the cassette to be removed from the device body;
a push-out member capable of shifting between a push-out position for coming into contact with the catch member provided in the device body and pushing out the cassette in a removing direction when the lock member is in the lock release position, and a retracted position separated from the catch member;
a lock release member coupled to the lock member and the push-out member to be able to shift from a first position to a second position;
a protrusion portion formed in the lock release member;
a first rotating body having an engagement piece that engages the protrusion portion with rotation of the lock release member, and the push-out member; and
a second rotating body having the lock member;
wherein a latch member is provided in the device body to engage the lock member present in the lock position,
the cassette is provided with the lock member, the push-out member and the lock release member, and by the lock release member shifting from the first position to the second position, the lock member is shifted from the lock position to the release position, while the push-out member is shifted from the retracted position to the push-out position,
the lock release member is configured to be able to shift to a third position of not acting on the lock member and the push-out member after shifting from the first position to the second position, the cassette is configured so that the push-out member shifts in a first direction by the lock release member shifting from the first position to the second position, and that the push-out member shifts in a second direction by the lock release member shifting from the third position to the first position; the push-out member and the lock member concurrently shift when the push-out member shifts in the first direction; and only the push-out member shifts when the push-out member shifts in the second direction, and when the protrusion portion and the engagement piece engage with each other and the first rotating body rotates in the first direction by the lock release member rotating from the first position to the second position, the second rotating body rotates in conjunction with the first rotating body, the lock member thereby shifts to the lock release position to release engagement with the latch member, and by rotation of the first rotating body, the push-out member shifts to the push-out position to come into contact with the catch member.

5. The cassette attachment device according to claim 4, wherein the first rotating body and the second rotating body are stacked on the same axis and disposed, on mutually connected surfaces are formed tapers with respective inclined directions being opposite so that when one of the first rotating body and the second rotating body rotates and a rise portion of the taper of the first rotating body is engaged in a rise portion of the taper of the second rotating body, the other body rotates in conjunction with the one, a first biasing member that biases the lock member in a direction of the lock position is further provided, the second rotating body rotates by the rise portion of the taper of the first rotating body pressing the rise portion of the taper of the second rotating body, by rotation of the first rotating body in the first direction by the protrusion portion pressing the engagement piece when the lock release member rotates from the first position to the second position, the lock member shifts to the lock position against biasing of the first biasing member, the first rotating body rotates by the rise portion of the taper of the second rotating body pressing the rise portion of the taper of the first rotating body, by rotation of the second rotating body in the second direction by biasing of the first biasing member when the lock release member arrives at the second position and the protrusion portion does not press the engagement piece, the position relationship between the protrusion portion and the engagement piece is thereby swapped, and when the lock release member is next rotated to the first position, the protrusion portion presses the engagement piece so that the first rotating body rotates in the second direction.

6. The cassette attachment device according to claim 5, further comprising:

a second biasing member that biases the first rotating body to rotate in the first direction, wherein the rise portion of the taper of the first rotating body is not engaged in the rise portion of the taper of the second rotating body when the lock release member rotates to the first position, the first rotating body rotates alone in the second direction by engagement between the protrusion portion and the engagement piece, and when the engagement between the protrusion portion and the engagement piece is released by rotation of the lock release member, returns and rotates in the first direction by being biased by the second biasing member, the position relationship between the protrusion portion and the engagement piece is thereby swapped, and when the lock release member is next rotated from the first position to the second position, the protrusion portion presses the engagement piece so that the first rotating body rotates in the first direction.

7. The cassette attachment device according to claim 6, wherein the lock member is provided with an inclined portion that comes into contact with the latch member in inserting the cassette in the device body, the lock member shifts to the lock release position by contact of the inclined portion with the latch member, and then, shifts to the lock position to engage in the latch member by biasing of the first biasing member when the contact between the lock member and the latch member is released, at this point the second rotating body rotates in the first direction by the lock member shifting to the lock release position, the first rotating body rotates together with the second rotating body by biasing of the second biasing member, engagement is thereby maintained between the rise portion of the taper of the first rotating body and the rise portion of the taper of the second rotating body, and when the contact between the lock member and the latch member is released and the second rotating body rotates in the second direction by the lock member shifting to the lock position, the first rotating body rotates in conjunction therewith by the rise portion of the taper of the second rotating body pressing the rise portion of the taper of the first rotating body.

8. The cassette attachment device according to claim 2, wherein the cassette further comprises a coupling portion rotatably coupling the grip member and the housing, on surfaces on which the grip member and the housing contact each other are formed with respective tapers with inclined directions being mutually opposite, and when the grip member is in the third position, the tapers of the grip member and the housing are engaged with each other.

9. The cassette attachment device according to claim 1, wherein the cassette further comprises a spring biasing the grip member toward the first position.

10. A cassette adapted to detachably attach to a device body, the cassette comprising:

a housing adapted to be detachably attached to the device body;

a lock member attached to the housing, the lock member shifting between a lock position to lock the housing inserted in the device body and a lock release position to release the lock to remove the housing from the device body;

a push-out member associated with the lock member, the push-out member shifting between a push-out position to push out the housing in a direction for removing from the device body when the lock member is in the lock release position, and an insertion position to allow the housing to be inserted; and a lock release member coupled to the lock member and the push-out member to shift from a first position to a second position, the lock release member being a grip member provided rotatably at the housing, wherein when the lock release member shifts from the first position to the second position, the lock member shifts from the lock position to the release position, and the push-out member shifts from the insertion position to the push-out position.

11. The cassette according to claim 10, wherein the lock release member is arranged to shift to a third position in which the lock release member does not act on the lock member and the push-out member, after shifting from the first position to the second position.

12. The cassette according to claim 11, wherein the lock release member shifts from the first position to the second position so that the push-out member shifts in a first direction, and the lock release member shifts from the third position to the first position so that the push-out member shifts in a second direction, the push-out member and the lock member concurrently shift when the push-out member shifts in the first direction, and only the push-out member shifts when the push-out member shifts in the second direction.

13. The cassette according to claim 10, further comprising a coupling portion rotatably coupling the grip member and the housing, wherein on surfaces on which the grip member and the housing contact each other are formed respective tapers with inclined directions being mutually opposite, so that when the grip member is in the third position, the tapers of the grip member and the housing are engaged with each other.

14. The cassette according to claim 10, further comprising a spring biasing the grip member toward the first position.

* * * * *